US012151390B2

(12) United States Patent
Kachi et al.

(10) Patent No.: US 12,151,390 B2
(45) Date of Patent: Nov. 26, 2024

(54) CHAINSAW

(71) Applicant: MAKITA CORPORATION, Anjo (JP)

(72) Inventors: Hideki Kachi, Anjo (JP); Tsunahisa Nakamura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 279 days.

(21) Appl. No.: 17/950,381

(22) Filed: Sep. 22, 2022

(65) Prior Publication Data

US 2023/0112387 A1 Apr. 13, 2023

(30) Foreign Application Priority Data

Sep. 27, 2021 (JP) ................................ 2021-157162

(51) Int. Cl.
*B27B 17/02* (2006.01)
*B27B 17/00* (2006.01)

(52) U.S. Cl.
CPC .......... *B27B 17/02* (2013.01); *B27B 17/0008* (2013.01)

(58) Field of Classification Search
None
See application file for complete search history.

(56) References Cited

U.S. PATENT DOCUMENTS

2019/0217496 A1* 7/2019 Shibata .................. B27B 17/02
2023/0099820 A1* 3/2023 Kachi ................. B27B 17/0008 30/383
2023/0112387 A1* 4/2023 Kachi ..................... B27B 17/02 30/165
2023/0208252 A1* 6/2023 Fujii ........................ H02K 9/28 310/58
2023/0271345 A1* 8/2023 Ebner ..................... B27B 17/02 30/381

FOREIGN PATENT DOCUMENTS

JP 2016-159381 A 9/2016
SE 543800 C2 * 7/2021 ............ A01G 3/053

* cited by examiner

*Primary Examiner* — Hwei-Siu C Payer
(74) *Attorney, Agent, or Firm* — Sughrue Mion, PLLC

(57) ABSTRACT

The description herein discloses a chainsaw, which may include: a saw chain; a guide bar equipped with the saw chain; a sprocket for running the saw chain along a periphery of the guide bar; a motor including an output shaft connected to the sprocket; a cooling fan connected to the output shaft; and a base member for holding the guide bar. The base member may be constituted of a heat conductive material having a thermal conductivity of 10 W/m·K or more when a temperature of the heat conductive material is 300 K. The base member may include: a plate portion arranged such that the plate portion faces the motor in a direction along the output shaft; and a rib portion protruding from the plate portion toward the motor.

4 Claims, 18 Drawing Sheets

CHAINSAW

CROSS-REFERENCE TO RELATED APPLICATION(S)

This application claims priority to Japanese patent application No. 2021-137162, filed on Sep. 27, 2021, the entire contents of which are incorporated herein by reference.

TECHNICAL FIELD

The art disclosed herein relates to a chainsaw.

BACKGROUND

Japanese Patent Application Publication No. 2016-159381 describes a chainsaw. The chainsaw includes: a saw chain; a guide bar equipped with the saw chain; a sprocket for running the saw chain along a periphery of the guide bar; a motor including an output shaft connected to the sprocket; a cooling fan connected to the output shaft; and a base member for holding the guide bar. The base member includes a plate portion arranged such that the plate portion faces the motor in a direction along the output shaft.

SUMMARY

When an object is to be cut using a chainsaw, a temperature of a guide bar rises by frictional heat of a saw chain and the guide bar. When the guide bar becomes excessively hot, there is a risk that outer shell portions of a base member and members in the vicinity thereof exposed to outside become hot by heat transmission from the guide bar, and a user might unintentionally touch the hot outer shell portions. The disclosure herein provides art to suppress outer shell portions from becoming hot by heat transmission from a guide bar in a chain saw.

The disclosure herein discloses a chainsaw. The chain saw may comprise: a saw chain; a guide bar equipped with the saw chain; a sprocket for running the saw chain along a periphery of the guide bar, a motor including an output shaft connected to the sprocket; a cooling tan connected to the output shaft; and a base member for holding the guide bar. The base member may be constituted of a heat conductive material having a thermal conductivity of 10 W/m·K or more when a temperature of the heat conductive material is 300 K. The base member may include: a plate portion arranged such that the plate portion faces the motor in a direction along the output shaft; and a rib portion protruding from the plate portion toward the motor.

In the above configuration, since the base member has a high thermal conductivity, heat is transmitted from the guide bar to the base member when a temperature of the guide member rises. Further, in the above configuration, since cooling air by the cooling fan cools the plate portion and the rib portion of the base member while the motor is driving, heat can efficiently be rejected from the base member. Due to this, according to the above configuration, outer shells of the base member and members in the vicinity thereof can be suppressed from becoming hot by heat transmission from the guide bar.

DETAILED DESCRIPTION

Figure 1:
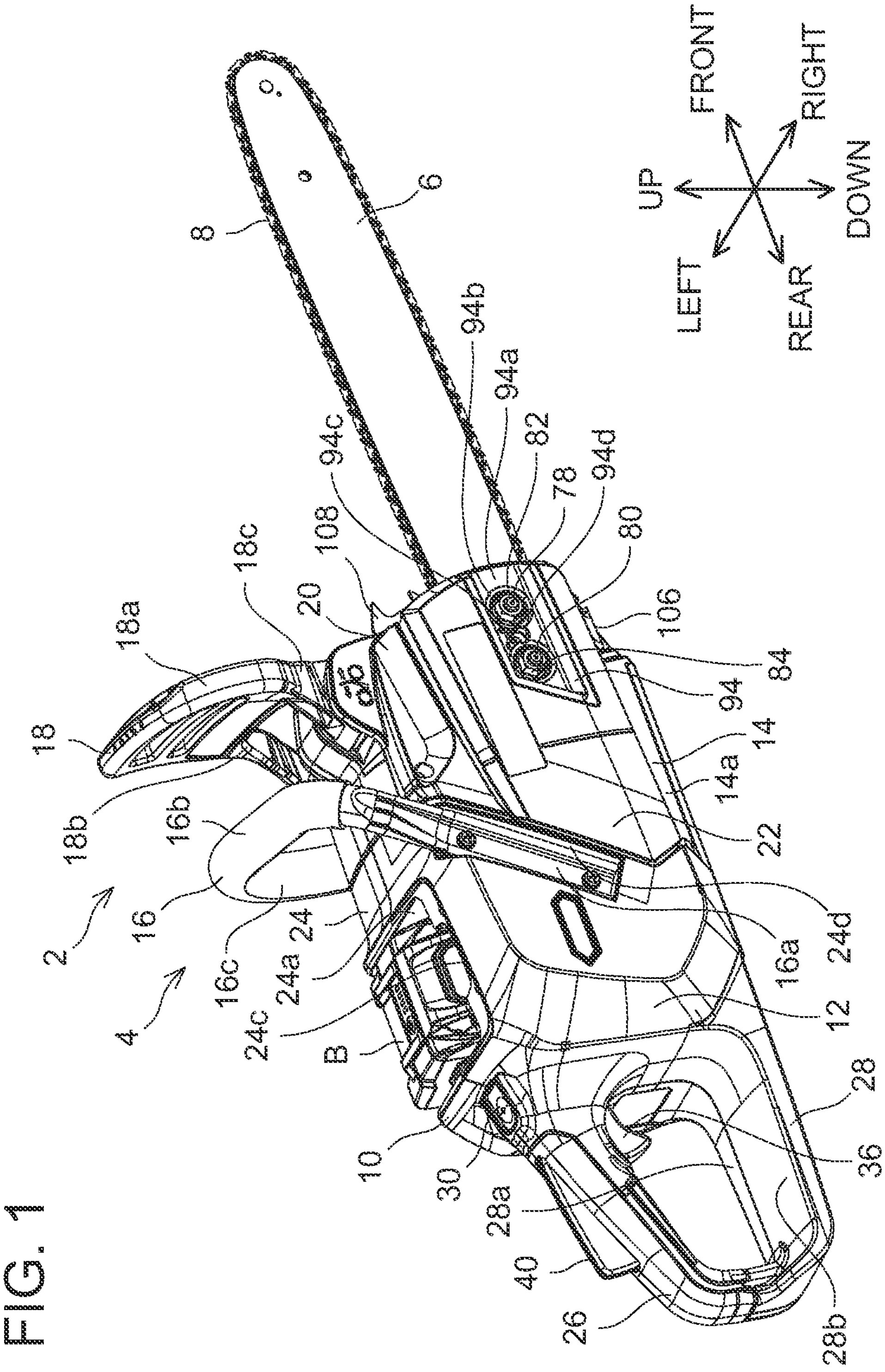
FIG. 1 is a perspective view seeing a chainsaw 2 of an embodiment from the rear right upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved chainsaws, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a chainsaw may comprise: a saw chain; a guide bar equipped with the saw chain; a sprocket for running the saw chain along a periphery of the guide bar; a motor including an output shaft connected to the sprocket; a cooling fan connected to the output shaft; and a base member for holding the guide bar. The base member may be constituted of a heat conductive material having a thermal conductivity of 10 W/m·K or more when a temperature of the heat conductive material is 300 K. The base member may include: a plate portion arranged such that the plate portion faces the motor in a direction along the output shaft; and a rib portion protruding from the plate portion toward the motor.

In the above configuration, due to the high thermal conductivity of the bae member, heat is transmitted from the guide bar to the base member when a temperature of the guide bar rises. Further, in the above configuration, cooling air by the cooling fan cook the plait portion and the rib portion of the base member while the motor is driving, thus the heat can efficiently be rejected from the base member. Due to this, according to the above configuration, outer shells of the base member and members in the vicinity thereof can be suppressed from becoming hot by heat transmission from the guide bar.

In one or more embodiments, the cooling fan may be a centrifugal fan. The cooling fan may be arranged between the motor and the plate portion. The rib portion may be arranged such that the rib portion surrounds the cooling fan from radially outside the cooling fan.

According to the above configuration, efficiency for the cooling fan to cool the base member can further be improved.

In one or more embodiments, the heat conductive material may be a magnesium alloy.

According to the above configuration, the base member that is light weight and having high thermal conductivity can be realized while securing rigidity and strength required for the base member.

Embodiment

Figure 2:
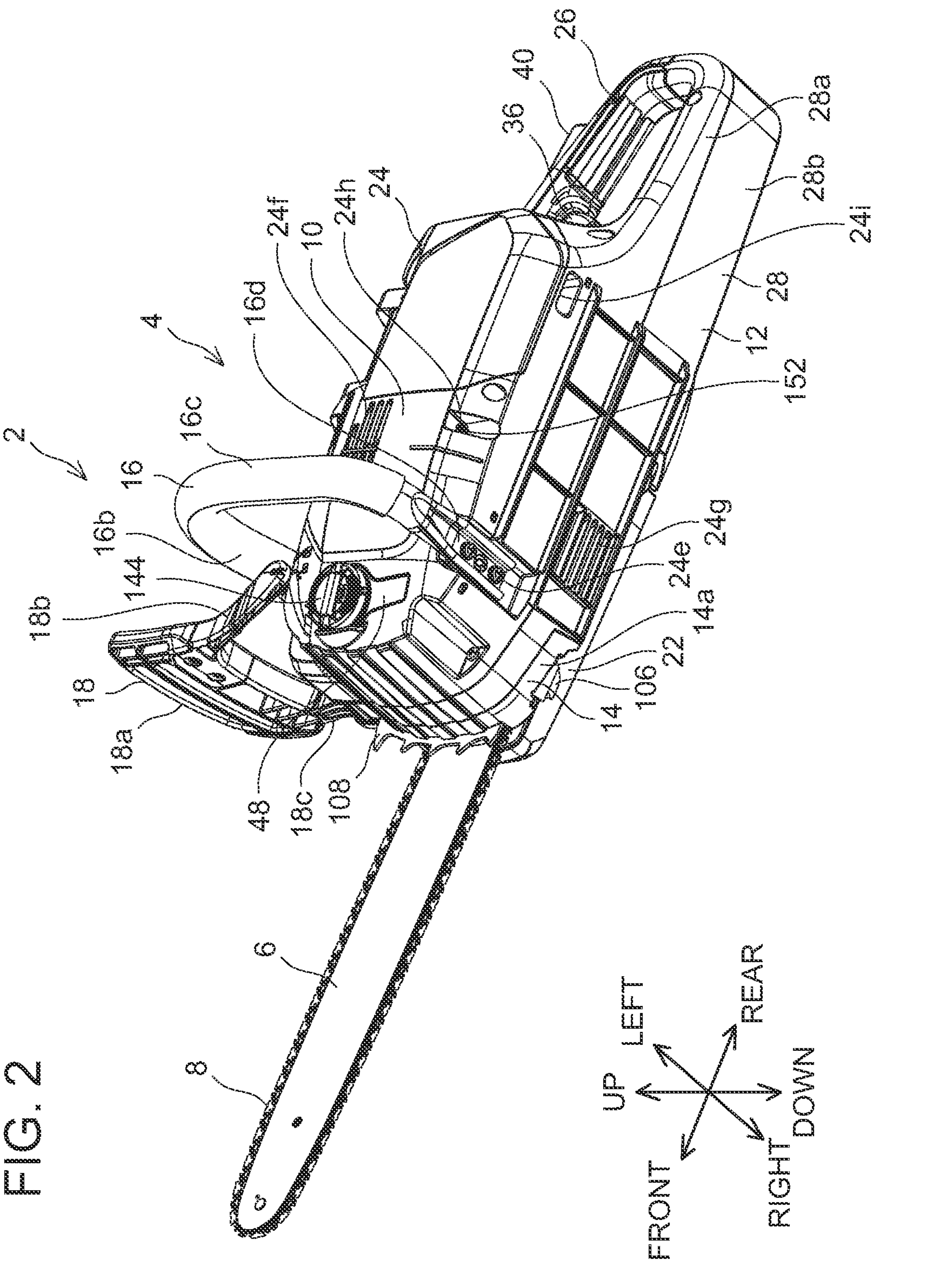
FIG. 2 is a perspective view seeing the chainsaw 2 of the embodiment from the front left lower side.
Figure 3:
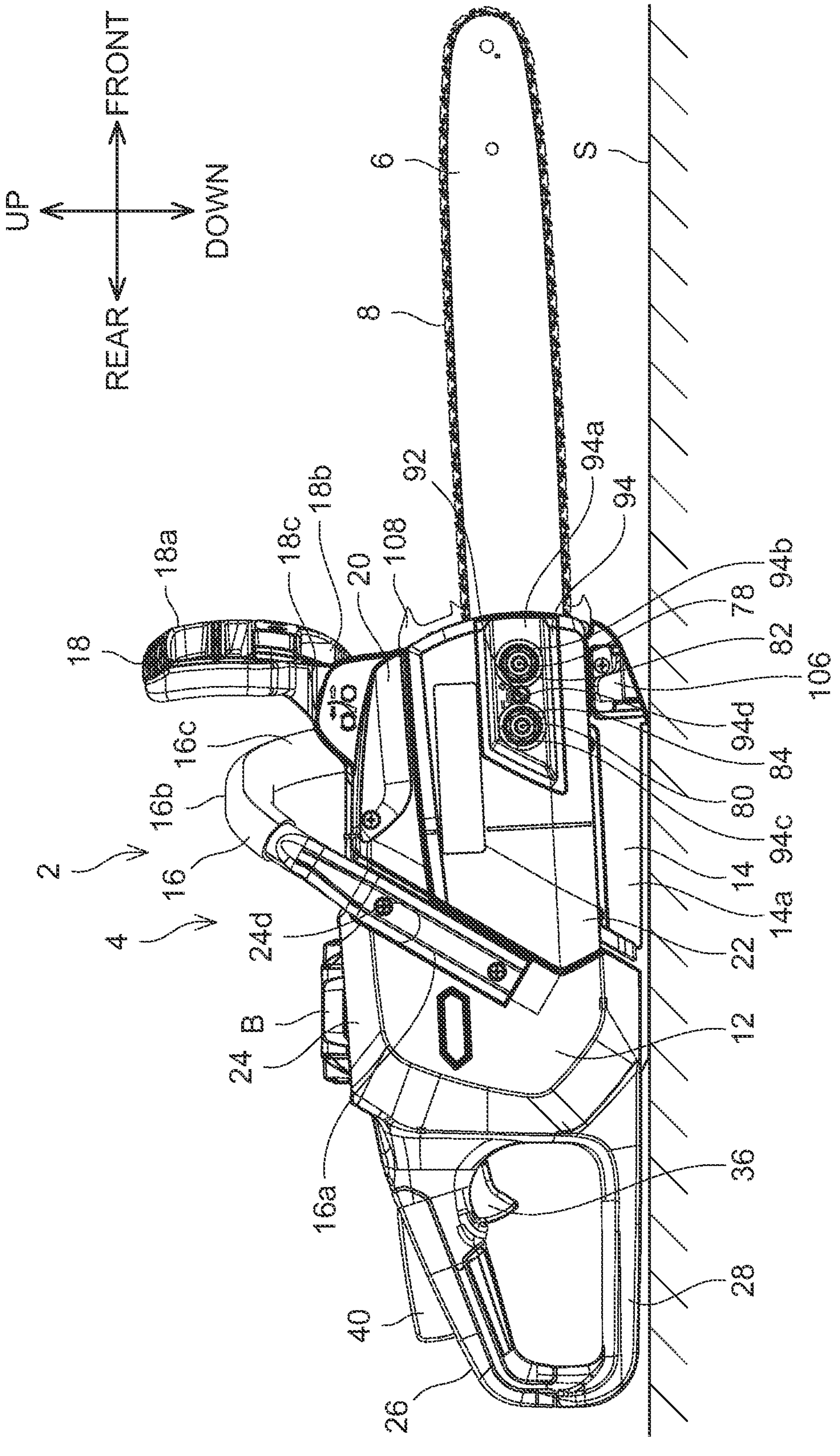
FIG. 3 is a side view seeing the chainsaw 2 of the embodiment from the right.

As shown in FIGS. 1 and 2, a chainsaw 2 of the present embodiment comprises a body 4, a guide bar 6, and a saw chain 8. The guide bar 6 is an elongated plate-shaped member attached to the body 4 such that it protrudes forward front the body 4. The guide bar 6 is constituted of a metal material such as iron. The saw chain 8 includes a plurality of cutters connected to each other, and is arranged along a periphery of the guide bar 6. A battery pack B is attached to the body 4. The chainsaw 2 is configured to cut objects such as wood materials by rotating the saw chain 8 along the periphery of the guide bar 6 using electric power supplied from the battery pack B. Various types of guide bars may be attached as the guide bar 6 in accordance with contents of cutting work. In the example shown in FIGS. 1 and 2, a curvature radius of the end of the guide bar 6 is 10 mm, for example. The chainsaw 2 of the present embodiment is configured to drive and rotate the saw chain 8 along the periphery of the guide bar 6 at a speed of 25.5 m/s, for example. In the following description, with respect to the chainsaw 2 placed on a horizontal mounting surface S such as the ground as shown in FIG. 3, a direction that orthogonally intersects the mounting surface S will be termed an up-down direction of the chainsaw 2, a direction defined by projecting a longitudinal direction of the guide bar 6 on the mounting surface S will be termed a front-rear direction of the chainsaw 2, and a direction orthogonally intersecting the up-down direction and front-rear direction of the chainsaw 2 will be termed a left-right direction of the chainsaw 2. In drawings other than FIGS. 1 to 3, depiction of the saw chain 8 is omitted for clearer indication of the drawings.

As shown in FIGS. 1 and 2, the body 4 comprises a left housing 10, aright housing 12, a base member 14, a front handle 16, a front hand guard 18, a brake cover 20, and a sprocket cover 22. The left housing 10, the right housing 12, the front hand guard 18, the brake cover 20, and the sprocket cover 22 are constituted of a resin material such as polyamide resin. The base member 14 is constituted of a metal material such as magnesium alloy. A thermal conductivity of the base member 14 may for example be 10 W/m·K or more, 30 W/m·K or more, or 50 W/m·K or more when its temperature is 300 K. The front handle 16 is constituted of a metal material such as aluminum alloy.

The body 4 includes a body housing 24, a rear handle 26, and a rear hand guard 28. The body housing 24 is constitute of a left housing 10, a right housing 12, a base member 14, and a brake cover 20. The rear handle 26 and the rear hand guard 28 are constituted of the left housing 10 and the right housing 12. The base member 14 is arranged to the right of a front portion of the right housing 12. The brake cover 20 is arranged to the right of the base member 14. The sprocket cover 22 is arranged to the right of the brake cover 20.

Figure 4:
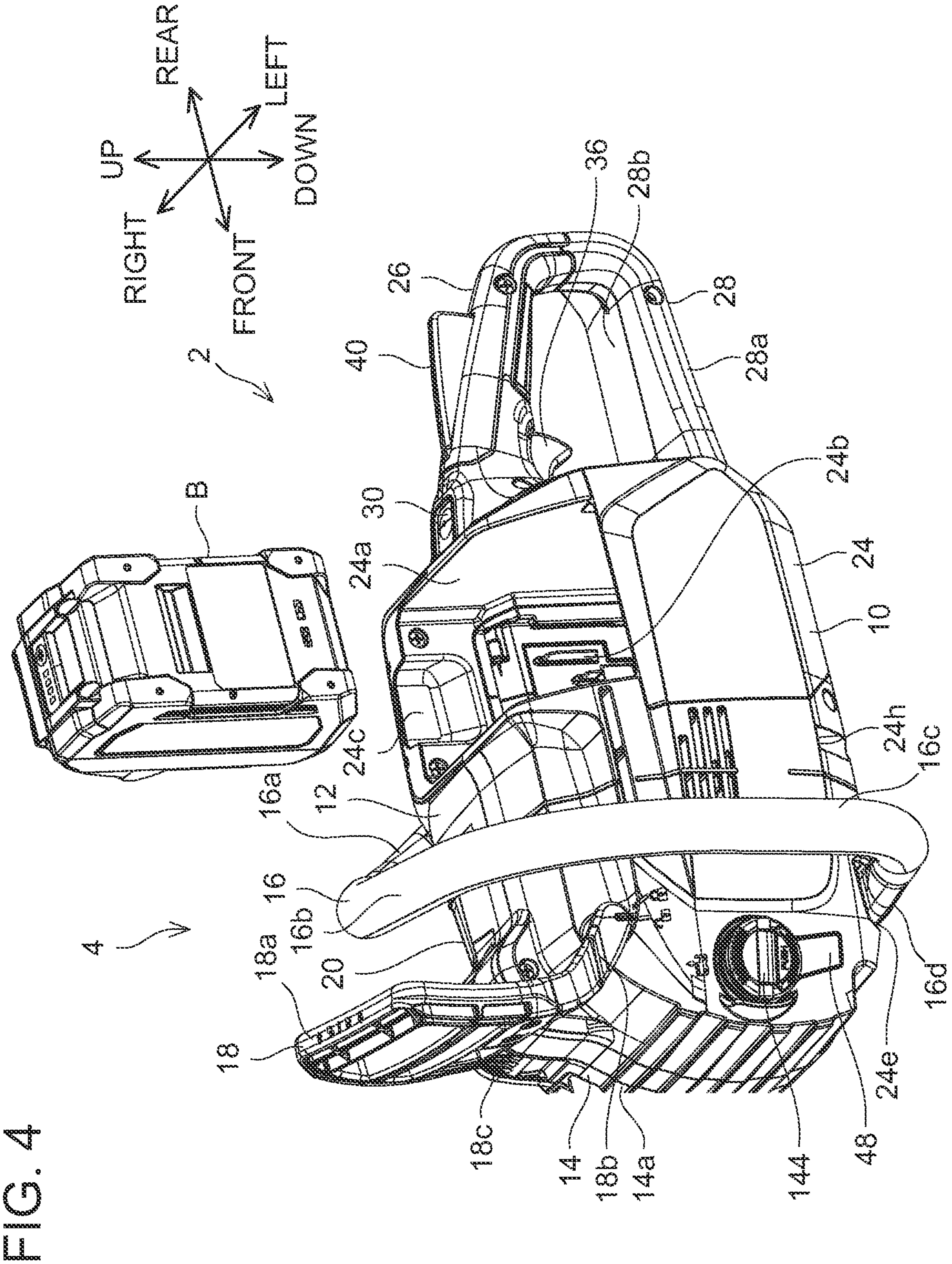
FIG. 4 is a perspective view seeing the chainsaw 2 of the embodiment from the front left upper side with a battery pack B detached from a battery pack receptacle 24*a*.

The body housing 24 has a substantially rectangular box shape with its longitudinal direction along the front-rear direction of the body 4. As shown in FIG. 4, a battery pack receptacle **24*a* that opens upward is defined in a rear portion of the body housing 24. A right inner surface of the battery pack receptacle 24*a* includes a battery pack attachment portion 24*b* to which the battery pack B can be detachably attached by sliding the battery pack B in the up-down direction. A recess 24*c* is defined at the upper end of the right inner surface of the battery pack receptacle 24*a*** to allow a user to easily grip the battery pack B upon attaching or detaching the battery pack B.

Figure 5:
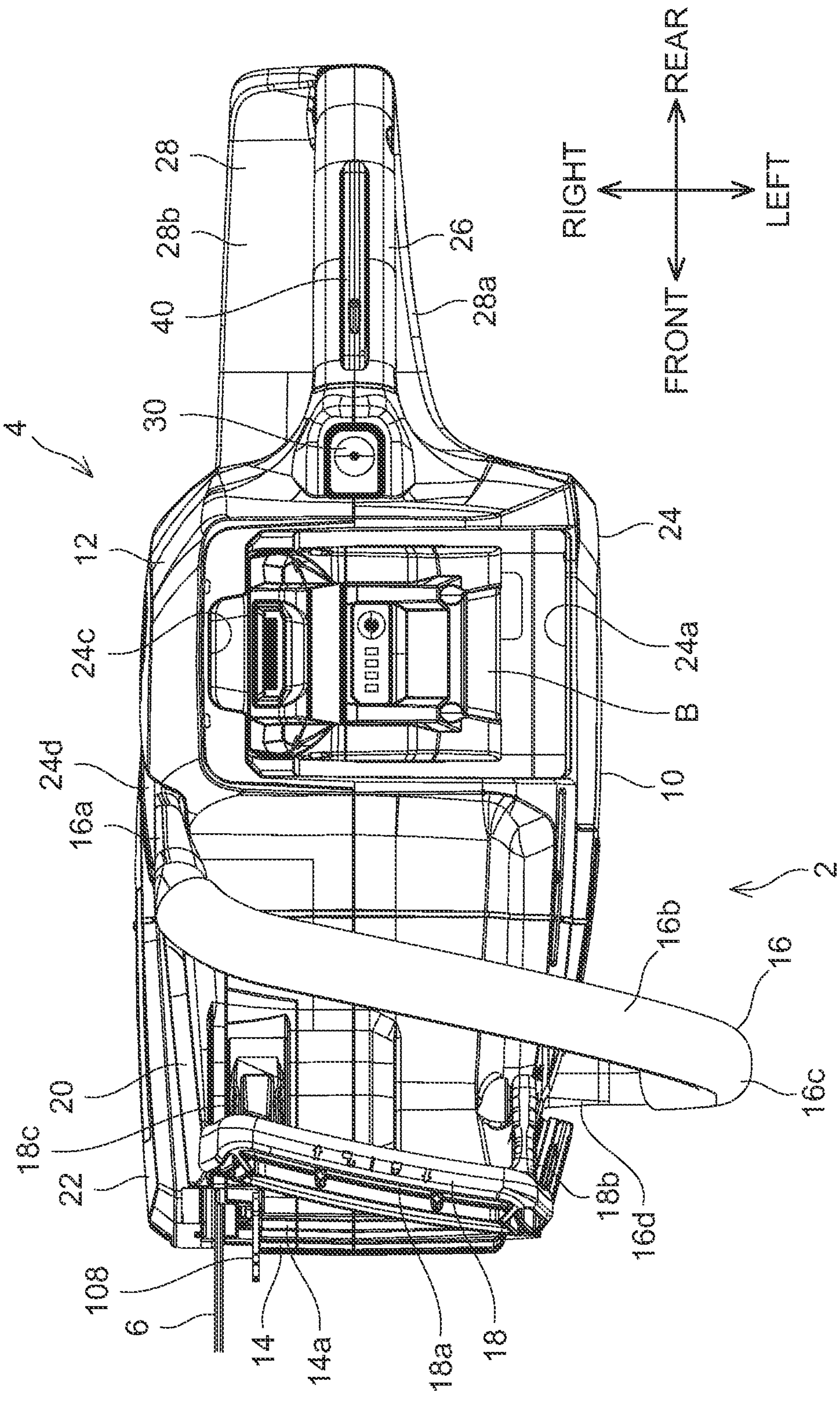
FIG. 5 is a plan view seeing a body housing 24 of the chainsaw 2 of the embodiment from above.

The rear handle 26 extends rearward and downward from an upper portion of a rear surface of the body housing 24, and is bent downward. The rear handle 26 has a substantially circular cross-sectional shape. The rear hand guard 28 extends rearward from a lower portion of the rear surface of the body housing 24, and connects to the lower end of the rear handle 26. The rear hand guard 28 has a substantially rectangular box shape of which dimension in the left-right direction is smaller than its dimension in the front-rear direction and of which dimension in the up-down direction is smaller than its dimension in the left-right direction. As shown in FIG. 5, the rear hand guard 28 has a shape that covers an entirety of the rear handle 26 from below. The rear hand guard 28 includes a first guard part **28*a* arranged directly below the rear handle 26** and a second guard part 28*b* extending rightward from the first guard part 28*a*. A hand of the user holding the rear handle 26 can be protected by the rear hand guard 28.

Figure 6:
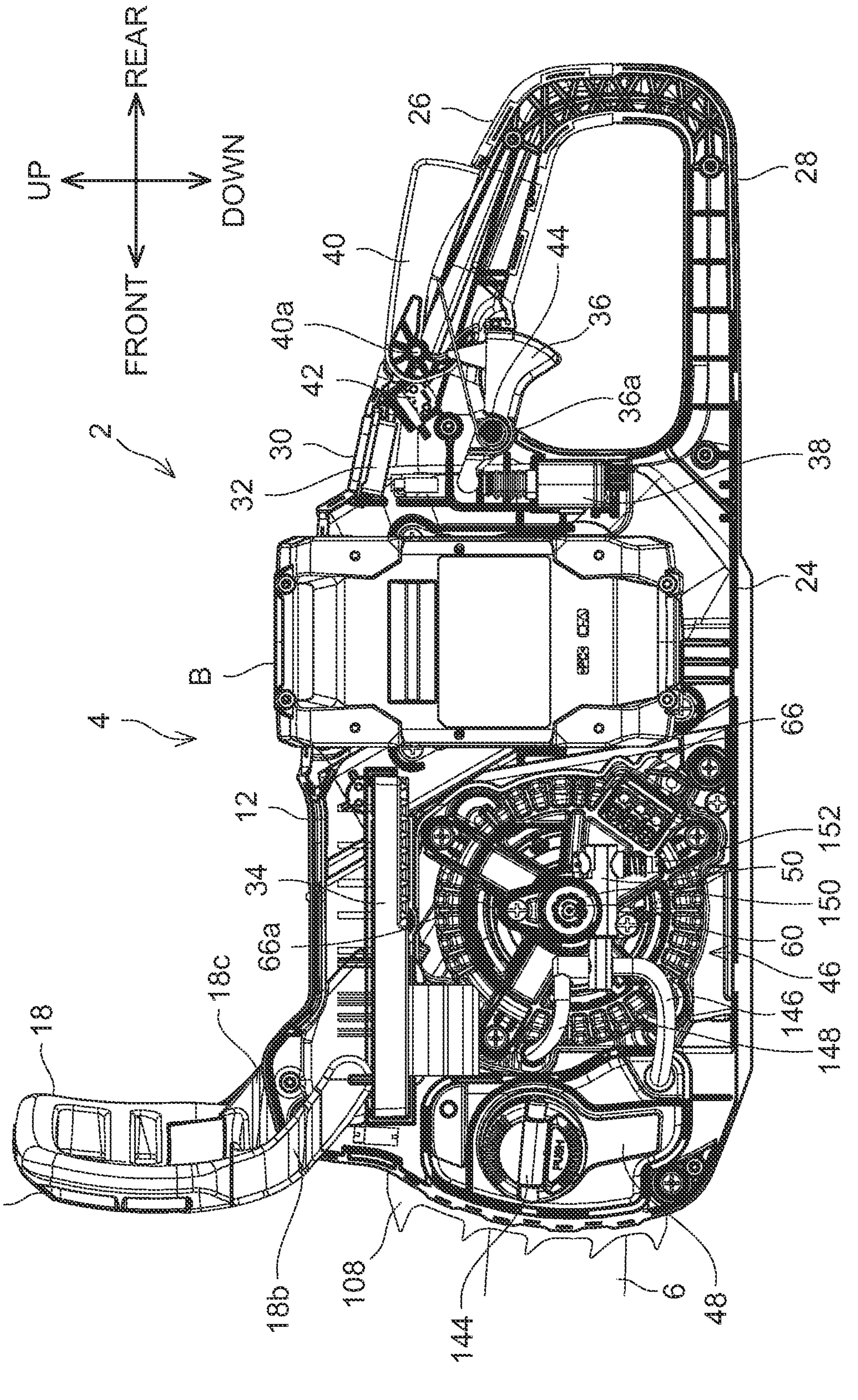
FIG. 6 is a side view seeing an interior of the body housing 24 of the chainsaw 2 of the embodiment from the left.

A power button 30 for the user to switch o/off of power of the chainsaw 2 is arranged on an upper surface of the rear handle 26 in the vicinity of its front end. As shown in FIG. 6, a power switch 32 configured to detect an operation performed on the power button 30 by the user is arranged inside the rear handle 24. The power switch 32 is electrically connected to a control unit 34 to be described later.

A trigger lever 36 for the user to control rotation of the saw chain 8 is arranged on a lower surface of the rear handle 26 in the vicinity of its front end. The trigger lever 36 is supported by the rear handle 26 such that it is rotatable about a rotation shaft 36*a* extending in the left-right direction. A trigger switch 38 configured to detect an operation by the user to pull up the trigger lever 36 is arranged inside the body housing 24 in the vicinity of its rear end. The trigger switch 38 is electrically connected to the control unit 34.

A lock lever 40 configured to switch between a state allowing the operation by the user on the trigger lever 36 and a state prohibiting such operation is arranged on the upper surface of the rear handle 26. The lock lever 40 is supported by the rear handle 26 such that it is rotatable about a rotation shaft 40*a* extending in the left-right direction. With the lock lever 40 rotated upward, upward rotation of the trigger lever 36 is prohibited due to the lock lever 40 interfering with the trigger lever 36. With the lock lever 40 rotated downward, the lock lever 40 does not interfere with the trigger lever 36, thus the upward rotation of the trigger lever 36 is thereby allowed. A grip detection switch 42 configured to detect an operation by the user to press down the lock lever 40 is arranged inside the rear handle 26 in the vicinity of its front end. The grip detection switch 42 is electrically connected to the control unit 34.

The trigger lever 36 and the lock lever 40 are connected to each other by a torsion spring 44. The torsion spring 44 biases the trigger lever 36 in a direction of rotating downward and biases the lock lever 40 in a direction rotating upward. Due to this, when the user is not touching the trigger lever 36, the trigger lever 36 is in a state rotated downward by a biasing force of the torsion spring 44. Further, when the user is not touching the lock lever 40, the lock lever 40 is in a state rotated upward by the biasing force of the torsion spring 44.

As shown in FIGS. 1 and 2, the font handle 16 includes a right fixing part 16*a* extending frontward and upward, an upper holding part 16*b* extending leftward and frontward from the upper end of the right fixing part 16*a*, a left holding part 16*c* extending downward from the left end of the upper holding part 16*b*, and a lower fixing part 16*d* extending rightward from the lower end of the left holding part 16*c*. The upper holding part 16*b* and the left holding part 16*c* have substantially circular cross-sectional shapes. As shown in FIG. 1, the right fixing part 16*a* is fixed to the body housing 24 (specifically, the right housing 12) by a fastener with the right fixing part 16*a* inserted in a right handle attaching groove 24*d* defined in a right surface of the body housing 24 (specifically, a right surface of the right housing 12). As shown in FIG. 2, the lower fixing part 16*d* is fixed to the body housing 24 (specifically, the left housing 10) by a fastener with the lower fixing part 16*d* inserted in a lower handle attaching groove 24*e* defined in a lower surface of the body housing 24 (specifically, a lower surface of the left housing 10).

When the user uses the chainsaw 2, he/she holds the chainsaw 2 by holding the rear handle 26 with the right hand and holding the front handle 16 (specifically, the upper holding part 16*b* or the left holding pan 16*c*) by the left hand. From this state, when the user presses down the lock lever 40 of the rear handle 26, the operation on the trigger lever 36 by the user is allowed, and the saw chain 8 rotates when the user pulls up the trigger lever 36 with the index finger of the right hand with the lock lever 40 pressed down.

As shown in FIG. 6, the control unit 34, a motor 46, an oil tank 48, and an oil pump 50 are arranged in a front portion of the inside of the body housing 24. The control unit 34, the motor 46, the oil tank 48, and the oil pump 50 are arranged frontward from the battery pack B. The oil tank 48 is arranged frontward from the motor 46 and the oil pump 50. The control unit 34 is arranged above the motor 46, the oil tank 48, and the oil pump 50 and along the front-rear direction and the left-right direction.

Figure 7:
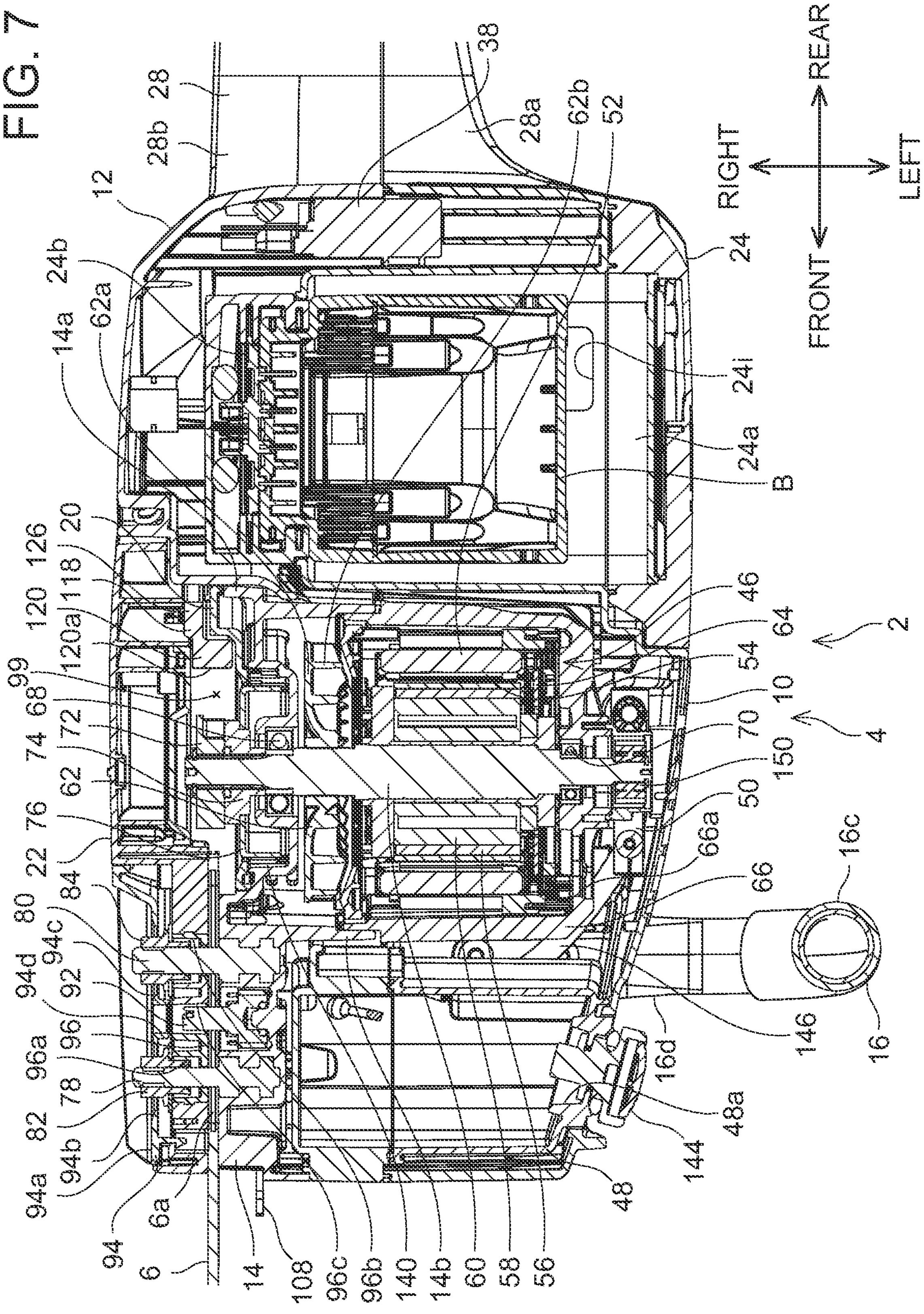
FIG. 7 is a horizontal cross-sectional view of the body housing 24 of the chainsaw 2 of the embodiment.

As shown in FIG. 7, the motor 46 is an inner rotor DC brushless motor. The motor 46 has a stator 54 on which a coil 52 is wound, a rotor 58 arranged inside the stator 54 and including a permanent magnet 56, an output shaft 60 arranged to penetrate the center of the stator 54 and the rotor 58 and fitted in the rotor 58, a cooling fan 62 fitted on the output shaft 60, and a sensor substrate 64 configured to detect rotation of the rotor 58.

Figure 8:
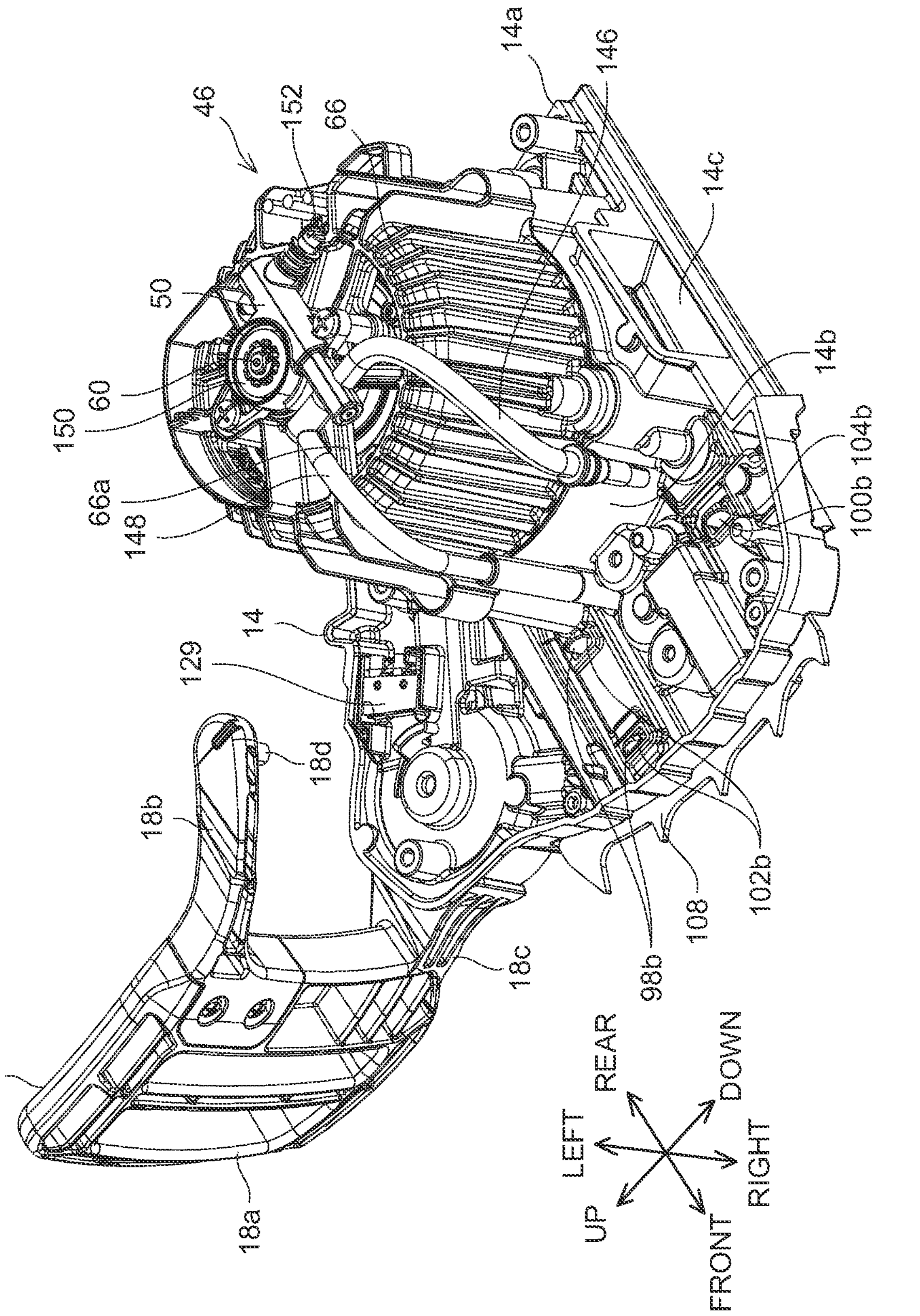
FIG. 8 is a perspective view seeing a base member 14, a front hand guard 18, a motor 46, an oil pump 50, and a motor casing 66 of the chainsaw 2 of the embodiment from the front left lower side.

The base member 14 includes a base plate 14*a* extending in the front-rear direction and the up-down direction and a substantially cylindrical supporting rib 14*b* protruding leftward from the base plate 14*a*. The base plate 14*a* and the supporting rib 14*b* are seamlessly integrated. As shown in FIG. 8, a motor casing 66 is fixed via a fastener to the left end of the supporting rib 14*b*. The motor casing 66 is constituted of a resin material such as polyamide resin. As shown in FIG. 7, the sensor substrate 64 is arranged facing the left end surface of the stator 54. The motor casing 66 has a shape cowering the stator 54 from radially outward and covering the left end surface of the stator 54 and the sensor substrate 64. The stator 54 and the censor substrate 64 are fixed to the motor casing 66 via a fastener. The coil 52 wound on the stator 54 and the sensor substrate 64 are each electrically connected to the control unit 34 (see FIG. 6). Although not shown, the control unit 34 includes a circuit board on which an inverter circuit having switching elements and a control circuit configured to control operations of the respective switching elements, and a substantially rectangular box-shaped casing that houses the circuit board. The control unit 34 is configured to control operations of the motor 46 by controlling a voltage to be applied to the coil 52 based on detection signals of the sensor substrate 64.

As shown in FIG. 7, the output shaft 60 is arranged along the left-tight direction of the chainsaw 2. The right end of the output shaft 60 penetrates through the right housing 12, the base plate 14*a*, and the brake cover 20 and protrudes rightward beyond the brake cover 20. The left end of the output shaft 60 penetrates through a left surface of the motor casing 66 and protrudes leftward beyond the left surface of the motor casing 66. The output shaft 60 is rotatably supported by the base plate 14*a* via a bearing 68 and is rotatably supported by the motor casing 66 via a bearing 70. The rotor 58 is arranged to the right of the bearing 70, the cooling fan 62 is arranged to the right of the rotor 58, and the bearing 68 is arranged to the right of the cooling fan 62.

The cooling fan 62 may be a centrifugal fan, and may be a plate fan including a disk-shaped plate 62*a* and a plurality of blades 62*b* protruding out from the plate 62*a*. As shown in FIG. 8, an air intake opening 66*a* is defined in the left surface of the motor casing 66. An air exhaust opening 14*c* is defined in the supporting rib 14*b* of the base member 14.

Figure 9:
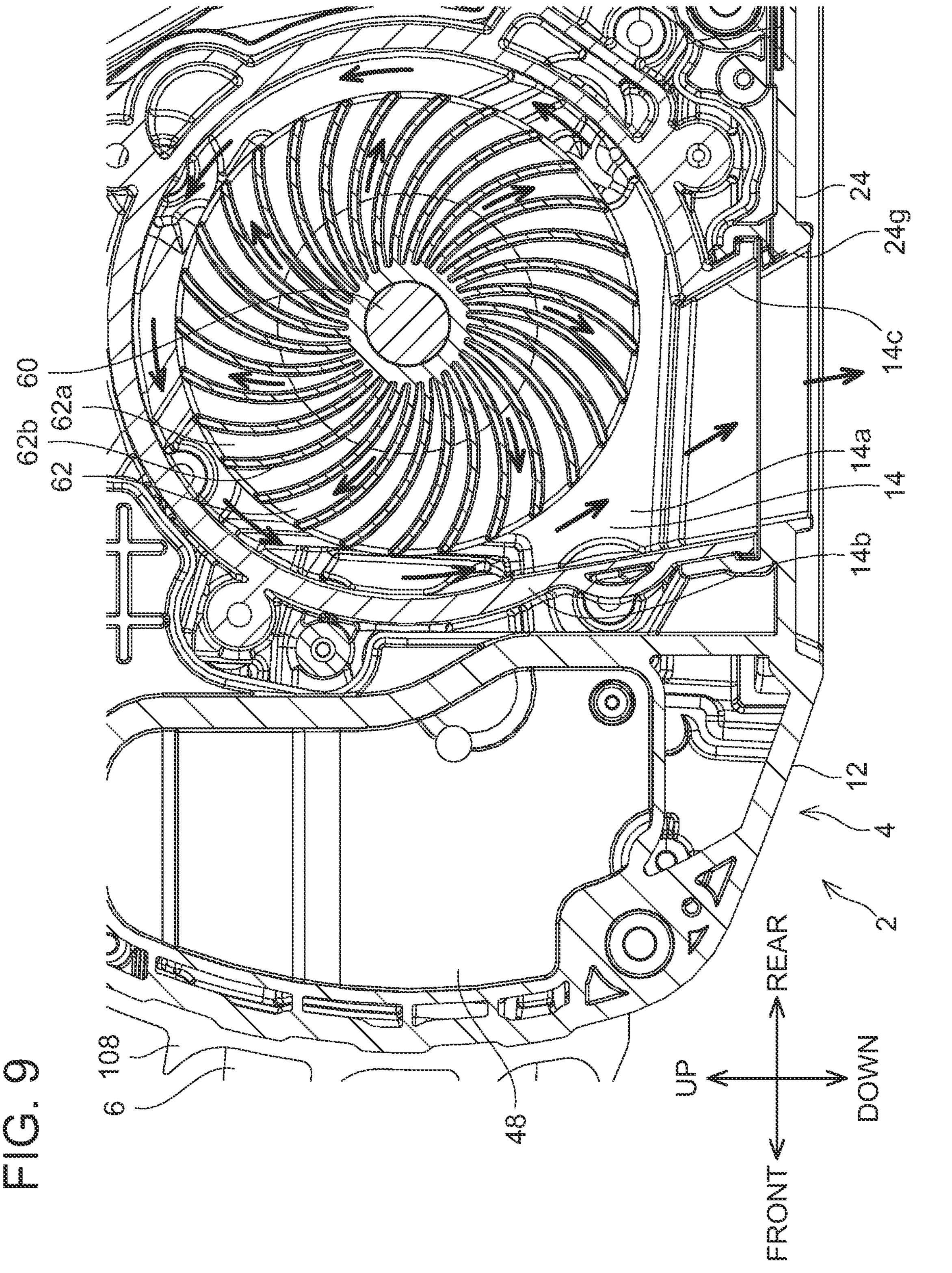
FIG. 9 is a vertical cross-sectional view of a cooling fan 62 of the chainsaw 2 of the embodiment and its vicinity.

Further, as shown in FIG. 2, an air inlet 24*f* is defined in a left surface of the body housing 24 (specifically, a left surface of the left housing 10), and an air outlet 24*g* is defined in a lower surface of the body housing 24 (specifically, a lower surface of the right housing 12). As shown in FIG. 9, the air outlet 24*g* is arranged facing the air exhaust opening 14*c*.

When the cooling fan 62 rotates, air outside the body housing 24 flows into the body housing 24 through the air inlet 24*f* shown in FIG. 2. The air that flowed into the body housing 24 flows into the motor casing 66 through the air intake opening 66*a* shown in FIG. 7. The air that flowed into the motor casing 66 flows past the sensor substrate 64 and flows in a gap between the stator 54 and the rotor 58, cools the stator 54 and the rotor 58, and thereafter reaches the cooling fan 62. As shown in FIG. 9, the air that reached the cooling fan 62 flows radially outward along the blades 62*b*, and thereafter flows in a circumferential direction along an inner surface of the supporting rib 14*b* and cools the base member 14, and thereafter flows out from the body housing 24 through the air exhaust opening 14*c* and the air outlet 24*g*.

As shown in FIG. 7, a sprocket 72 and a brake base 74 are fixed to the vicinity of the right end of the output shaft 60. The sprocket 72 and the brake base 74 are arranged to the right of the bearing 68. A brake drum 76 is fitted to the brake base 74.

Figure 10:
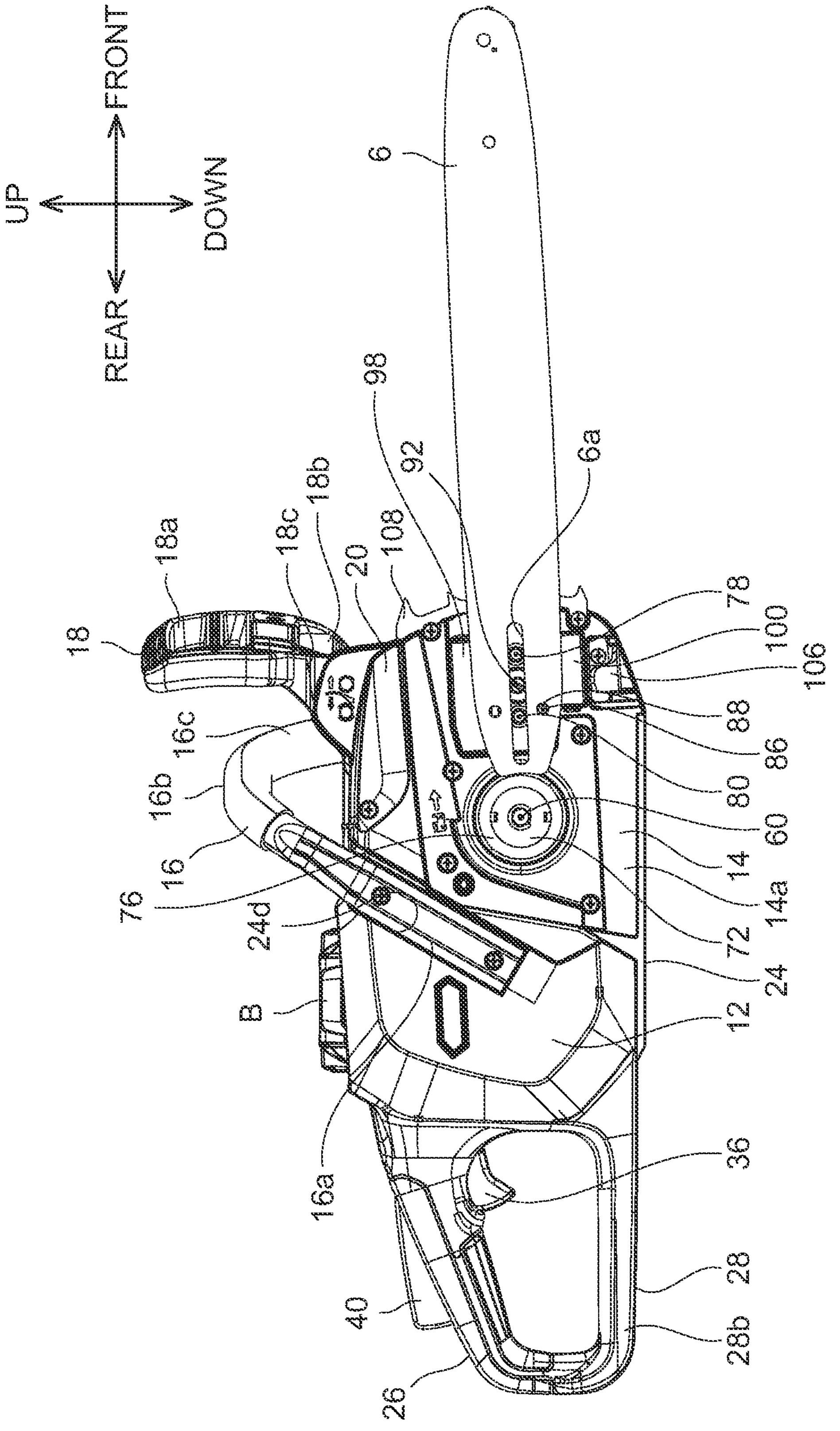
FIG. 10 is a side view seeing the chainsaw 2 of the embodiment from the right with a sprocket cover 22 detached.

As shown in FIG. 10, the sprocket 72 is exposed outside of the brake cover 20. The saw chain 8 is strapped over the sprocket 72 from the guide bar 6 (see FIGS. 1 to 3). When the motor 46 (see FIG. 7) is driven, the sprocket 72 rotates with the output shaft 60, and the saw chain 8 thereby rotates around the sprocket 72 and the guide bar 6.

A long hole 6*a* extending along the longitudinal direction of the guide bar 6 is defined in the guide bar 6. The guide bar 6 is supported by the base member 14 via bolts 78, 80 penetrating the long hole 6*a*. As shown in FIG. 7, the bolts 78, 80 are fixed to the base plate 14*a*. Nuts 82, 84 are fastened onto the bolts 78, 80 from outside the sprocket cover 22. The user can change a distance between the guide bar 6 and the sprocket 72 by sliding the guide bar 6 along the long hole 6*a* with the nuts 82, 84 loosened and thereby adjust tension on the saw chain 8.

Figure 11:
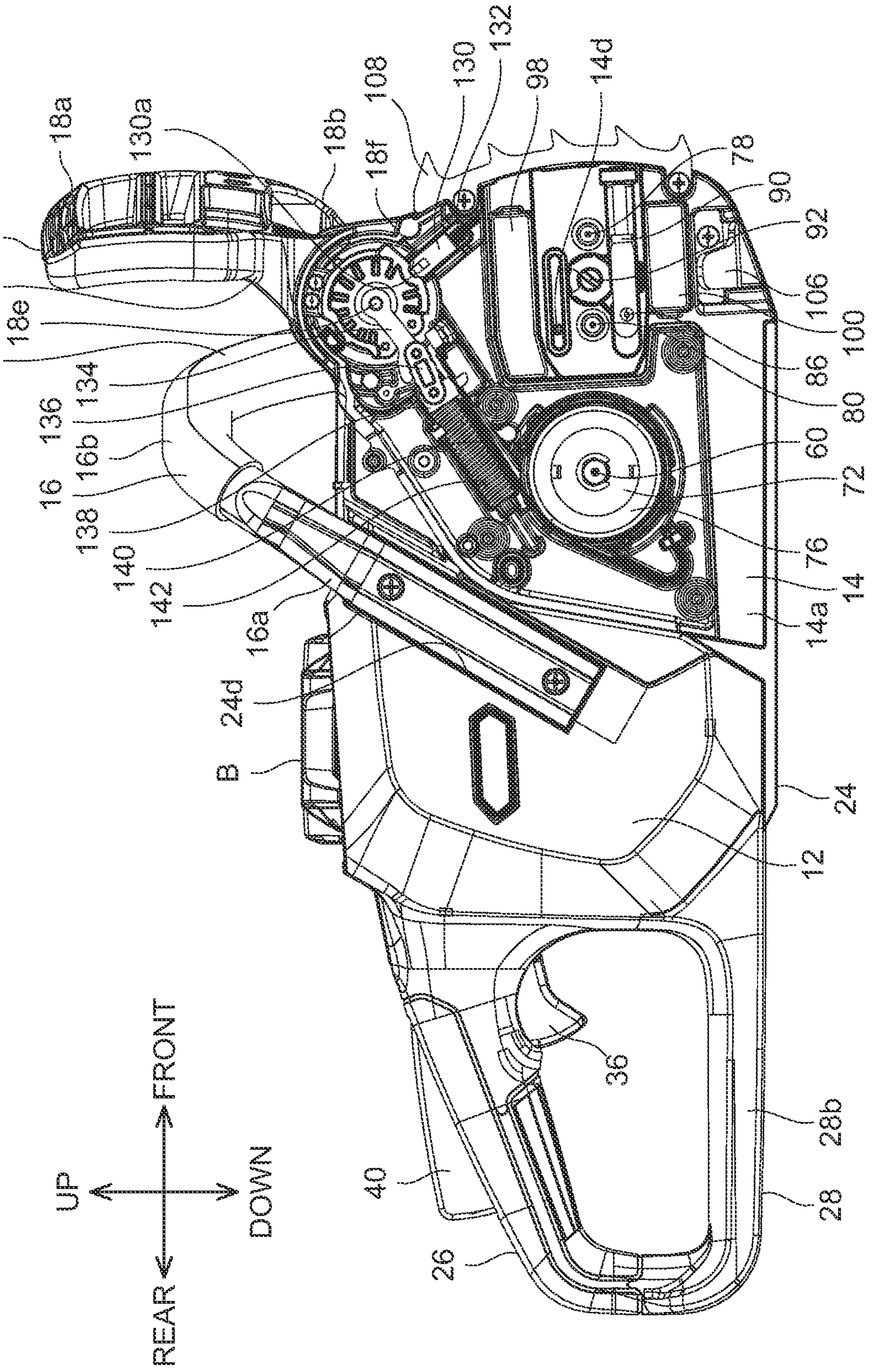
FIG. 11 is aside view seeing the chainsaw 2 of the embodiment from the right with the sprocket cover 22, a guide bar 6, and a brake cover 20 detached.

As shown in FIG. 10, an engaging hole 88 configured to engage with an engaging pin 86 is defined in the guide bar 6. As shown in FIG. 11, the engaging pin 86 is connected to an adjustment screw 92 via a rotation-linear motion converting mechanism 90. The rotation-linear motion converting mechanism 90 is configured to convert rotary motion of the adjustment screw 92 into linear motion of the engaging pin 86 along a direction of the long hole 6*a*. As shown in FIG. 10, the adjustment screw 92 is arranged between the bolt 78 and the bolt 80, and penetrates the long hole 6*a* without contacting an inner circumferential surface of the long hole 6*a*. When the user rotates the adjustment screw 92, the engaging pin 86 moves in the direction along the long hole 6*a* of the guide bar 6 and the guide bar 6 thereby slides in the direction along the long hole 6*a*.

As shown in FIG. 7, the sprocket 72 is covered by the sprocket cover 22. As shown in FIG. 1, an outer cover 94 is arranged on a right surface of the sprocket cover 22 in the vicinity of its front end. The outer cover 94 includes a recess 94*a* that is recessed leftward. The recess 94*a* includes fastening openings 94*b*, 94*c* for accessing the nuts 82, 84 fastened onto the bolts 78, 80 from outside and an adjusting opening 94*d* for accessing the adjustment screw 92 from outside. The user can tighten or loosen the nuts 82, 84 with the sprocket cover 22 attached. Further, the user can adjust the tension on the saw chain 8 by rotating the adjustment screw 92 through the adjusting opening 94*d* with the sprocket cover 22 attached.

As shown in FIG. 7, a sleeve 96 is arranged on the sprocket cover 22. The sleeve 96 is constituted of a metal material such as aluminum, and is configured integrally with the sprocket cover 22 by injection molding. The sleeve 96 includes bolt openings 96*a*, 96*b* through which the bolts 78, 80 penetrate and an adjustment screw opening 96*c* through which the adjustment screw 92 is inserted. When the nuts 82, 84 are fastened onto the bolts 78, 80, the guide bar 6 and the sleeve 96 are held and fixed between the nuts 82, 84 and the base plate 14*a*. Since a load applied to the sprocket cover 22 upon fastening the nuts 82, 84 is received by the sleeve 96, the sprocket cover 22 can be prevented from being damaged even when the nuts 82, 84 are firmly tightened.

Figure 12:
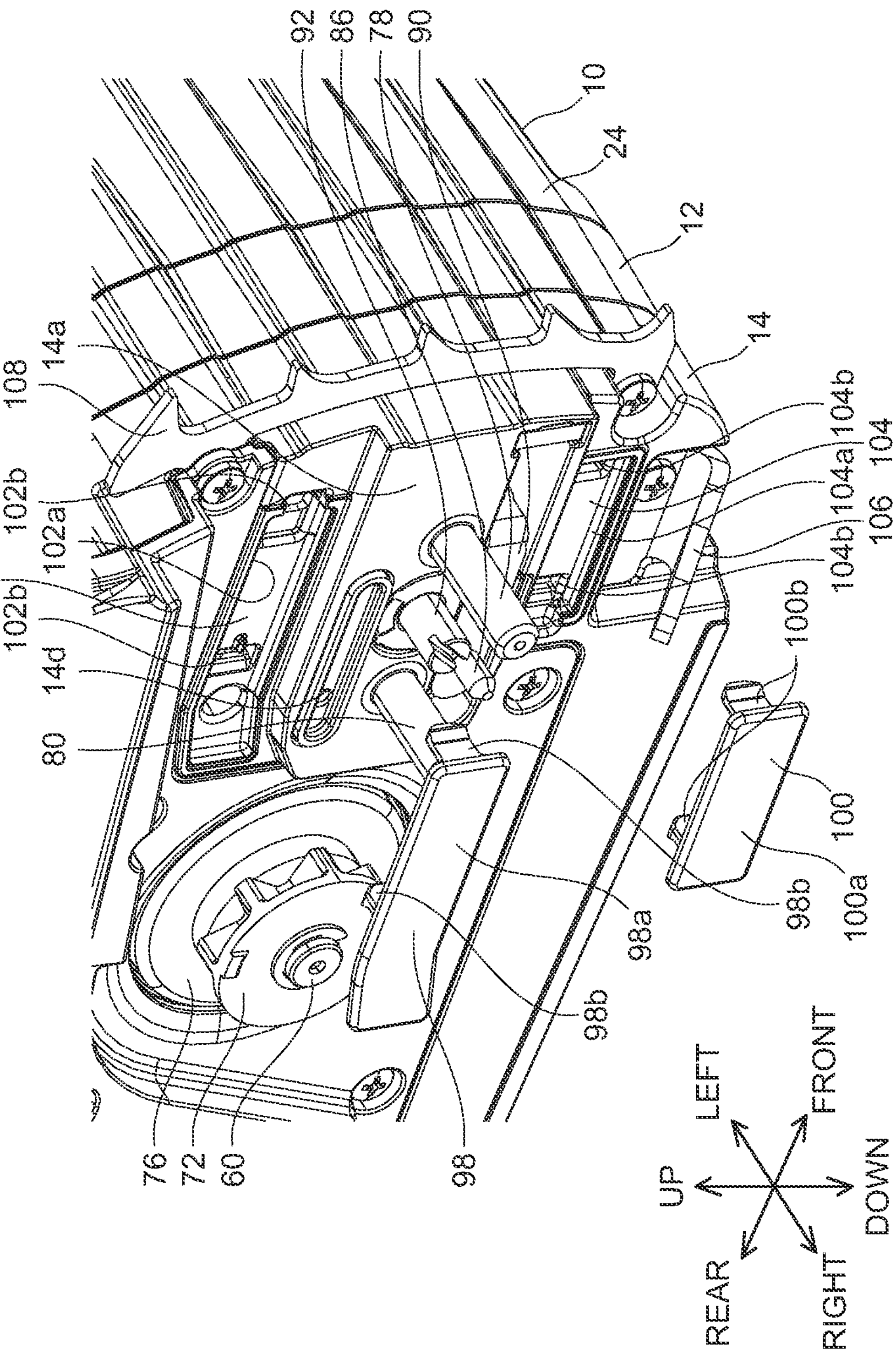
FIG. 12 is a disassembled perspective view of a front lower portion of the base member 14 of the chainsaw 2 of the embodiment and its vicinity.
Figure 13:
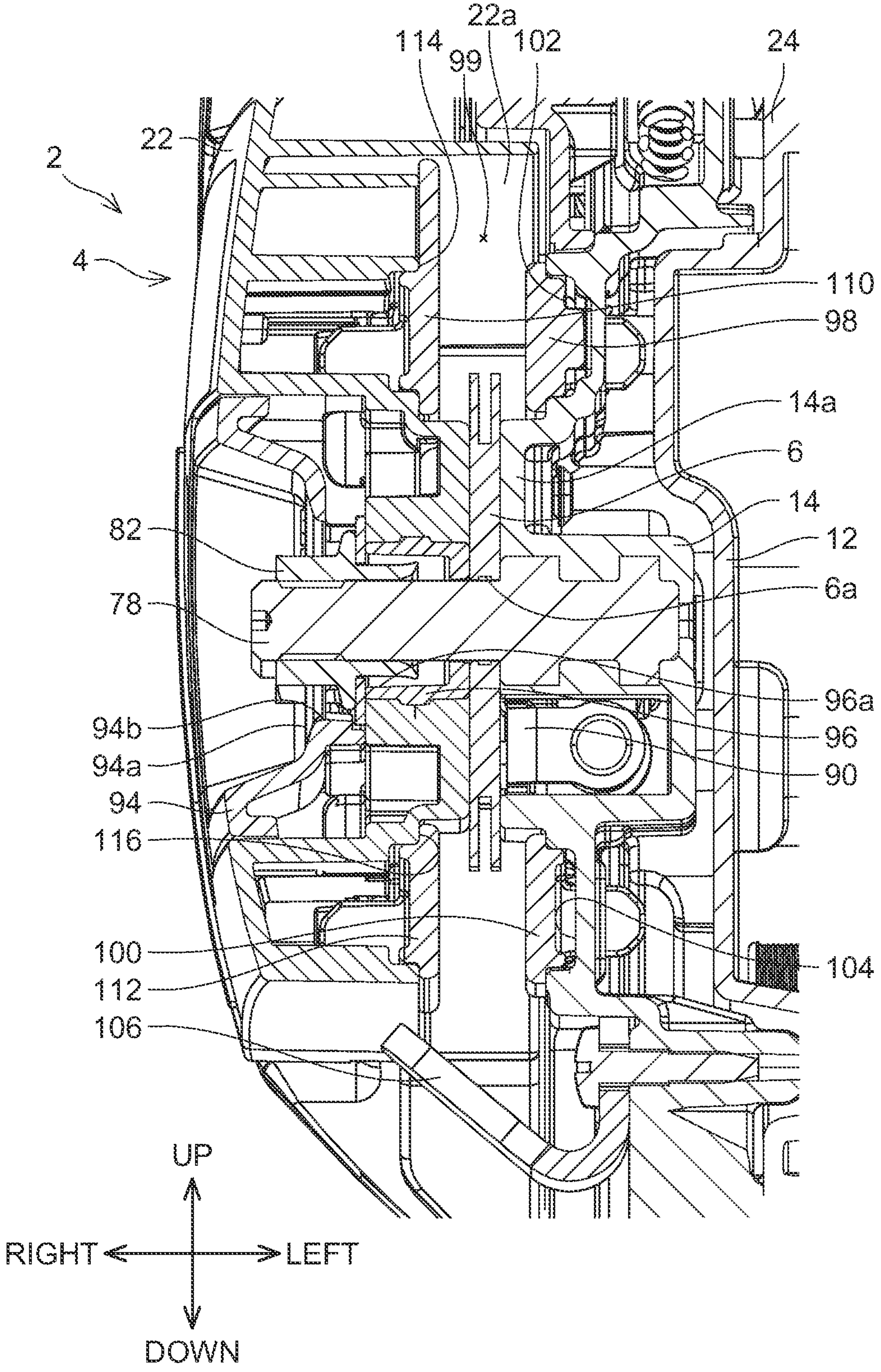
FIG. 13 is a vertical cross-sectional view of a bolt 78 of the chainsaw 2 of the embodiment and its vicinity.

As shown in FIG. 12, chain guides 98, 100 are arranged on the right surface of the base plate 14*a*. As shown in FIG. 11, the chain guide 98 is arranged above the bolts 78, 80 and the adjustment screw 92. The chain guide 100 is arranged below the bolt 78 and the adjustment screw 92. The chain guides 98, 100 are constituted of a resin material such as polyacetal resin. As shown in FIG. 13, a chain passage 99 through which the saw chain 8 (see FIGS. 1 to 3) passes is defined between the body housing 24 and the sprocket cover 22. By having the chain guide 98, the saw chain 8 (see FIGS. 1 to 3) passing through the chain passage 99 above the guide bar 6 can be suppressed from being tilted leftward and detached from the guide bar 6. Further, during the cutting work using the chainsaw 2, cutting chips may enter into the chain passage 99 as the saw chain 8 rotates, however, the presence of the chain guide 98 decreases a passage area of the chain passage 99 above the guide bar 6, by which the cutting chips can be suppressed from entering deep into the chain passage 99. Further, the presence of the chain guide 100 can suppress the saw chain 8 (see FIGS. 1 to 3) passing through the chain passage 99 below the guide bar 6 from being tilted leftward and detached from the guide bar 6.

As shown in FIG. 12, the chain guide 98 includes a substantially flat plate-shaped guiding part 98*a* and engaging parts 98*b* protruding leftward from the guiding part 98*a*. The chain guide 100 includes a substantially flat plate-shaped guiding part 100*a* and engaging parts 100*b* protruding leftward from the guiding part 100*a*. A guide attaching part 102 to which the chain guide 98 is detachably attached and a guide attaching part 104 to which the chain guide 100 is detachably attached are arranged on a right surface of the base plate 14*a*. The guide attaching part 102 includes an attaching groove 102*a* configured to receive the guiding part 98*a* and engagement receiving parts 102*b* to which the engaging parts 98*b* are to be engaged. The guide attaching part 104 includes an attaching groove 104*a* configured to receive the guiding part 100*a* and engagement receiving parts 104*b* to which the engaging parts 100*b* are to be engaged. By configuring as such, even when the chain guides 98, 100 are damaged due to contact with the saw chain 8, work to replace them with new chain guides 98, 100 can easily be performed.

A chain catcher 106 is fixed by a fastener below the guide attaching part 104 of the base plate 14*a*. The chain catcher 106 is constituted of a metal material such as an aluminum alloy. Due to the presence of the chain catcher 106, even if by chance the saw chain 8 is detached from the guide bar 6 while it is rotating, the saw chain 8 can be suppressed from flying off toward the user.

A spike 148 is fixed by fasteners to the front end of the base plate 14*a*. The spike 108 is constituted of a metal material such as iron. As show in in FIGS. 1 and 2, the spike 108 protrudes forward from the front surface of the body housing 24. When an object such as wood is to be cut using the chainsaw 2, the user can stab the object to be cut with the spike 108 and use it as a fulcrum to perform the cutting work with stability.

Figure 14:
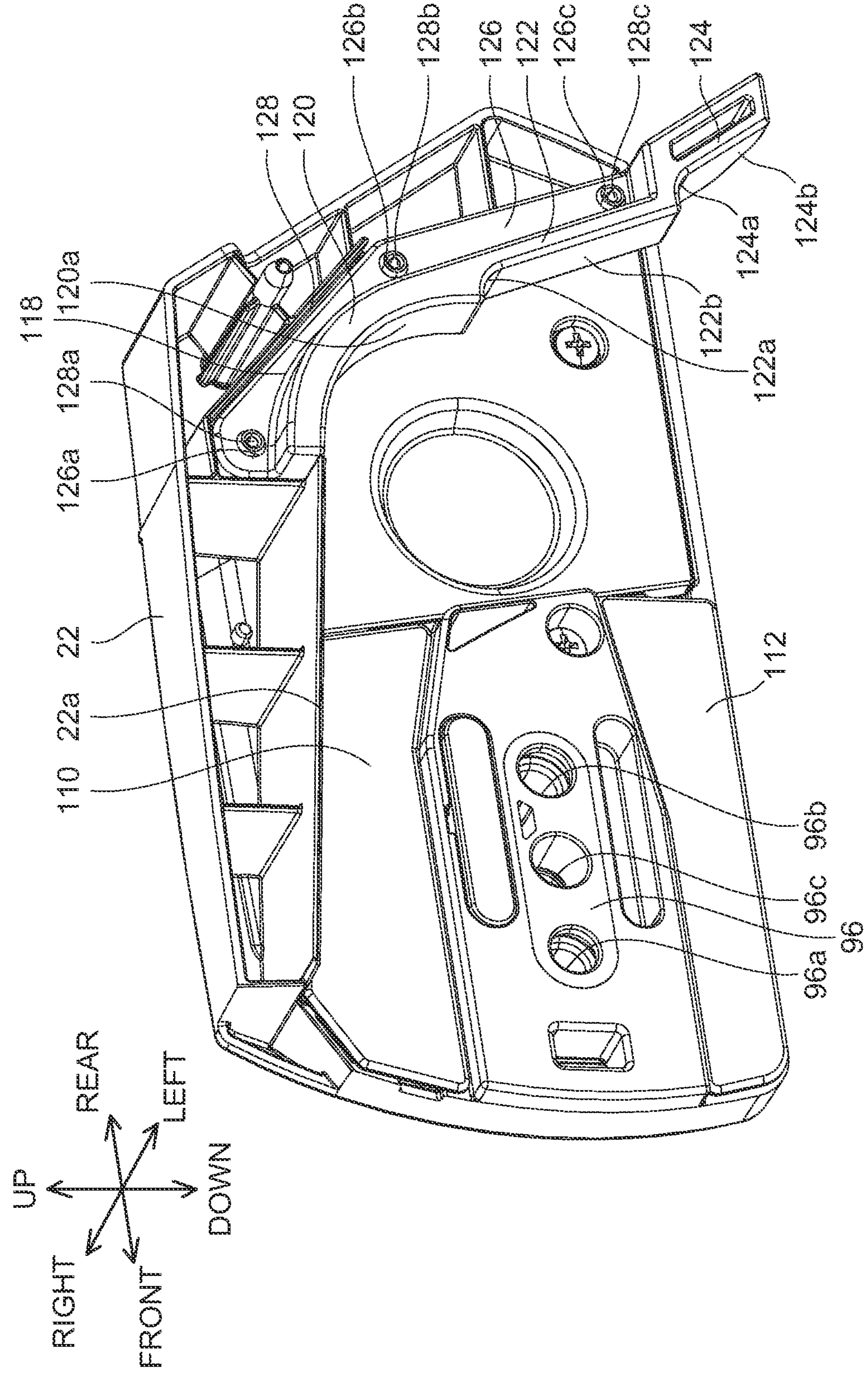
FIG. 14 is a perspective view seeing the sprocket cover 22 of the chainsaw 2 of the embodiment from the front left upper side.

As shown in FIG. 14, chain guides 110, 112 are arranged on the left surface of the sprocket cover 22. The chain guide 110 is arranged above the sleeve 96. The chain guide 112 is arranged below sleeve 96. The chain guides 110, 112 are constituted of a resin material such as polyacetal resin. As shown in FIG. 13, by having the chain guide 110, the saw chain 8 passing through the chain passage 99 above the guide bar 6 can be suppressed from being tilted rightward and detached from the guide bar 6. Further, the presence of the chain guide 110 decreases the passage area of the chain passage 99 above the guide bar 6, by which the cutting chips can be suppressed from entering deep into the chain passage 99. Further, the presence of the chain guide 112 can suppress the saw chain 8 passing through the chain passage 99 below the guide bar 6 from being tilted rightward and detached from the guide bar 6.

Figure 15:
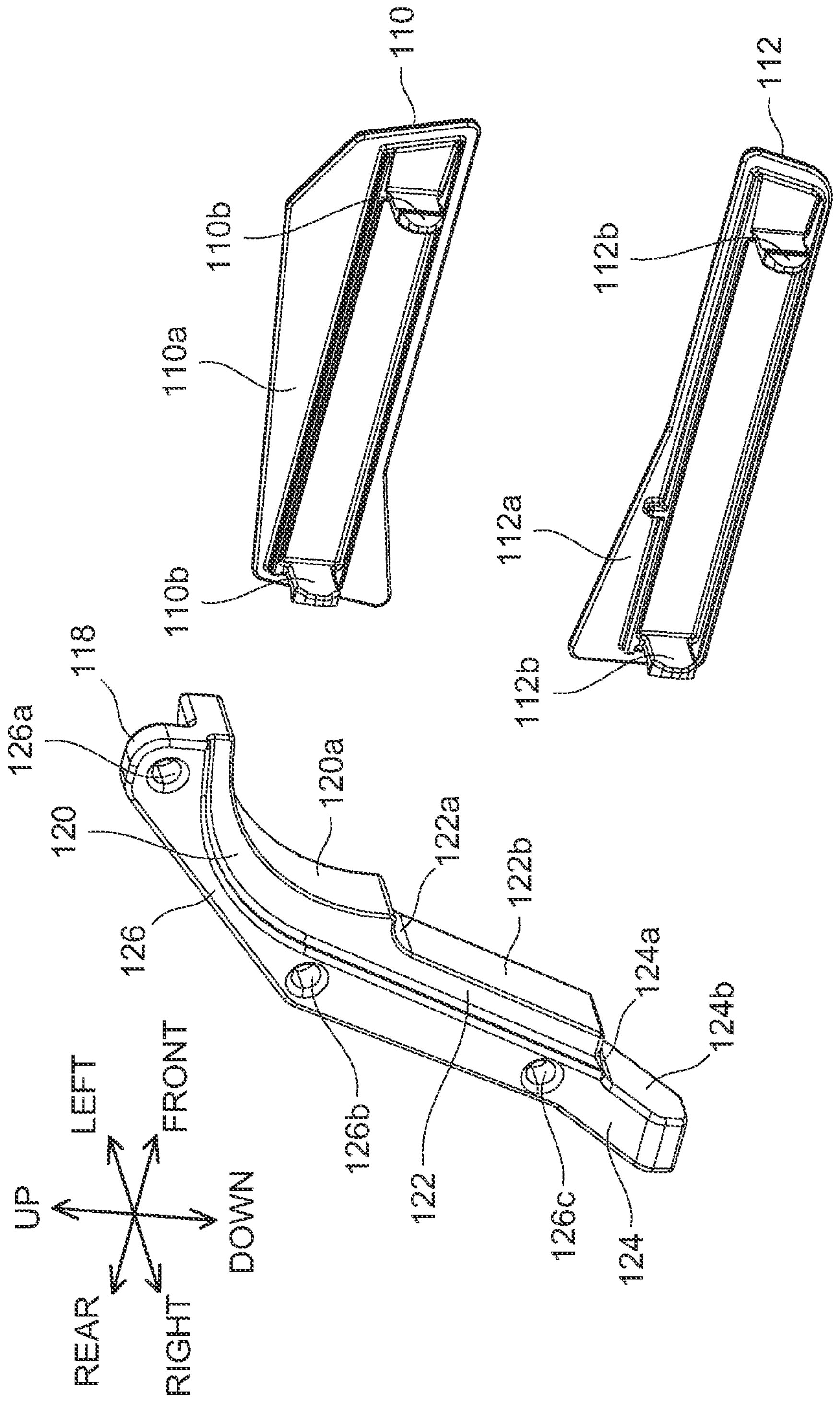
FIG. 15 is a perspective view seeing chain guides 110, 112 and a chip guide 118 of the chainsaw 2 of the embodiment from the front right upper side.
Figure 16:
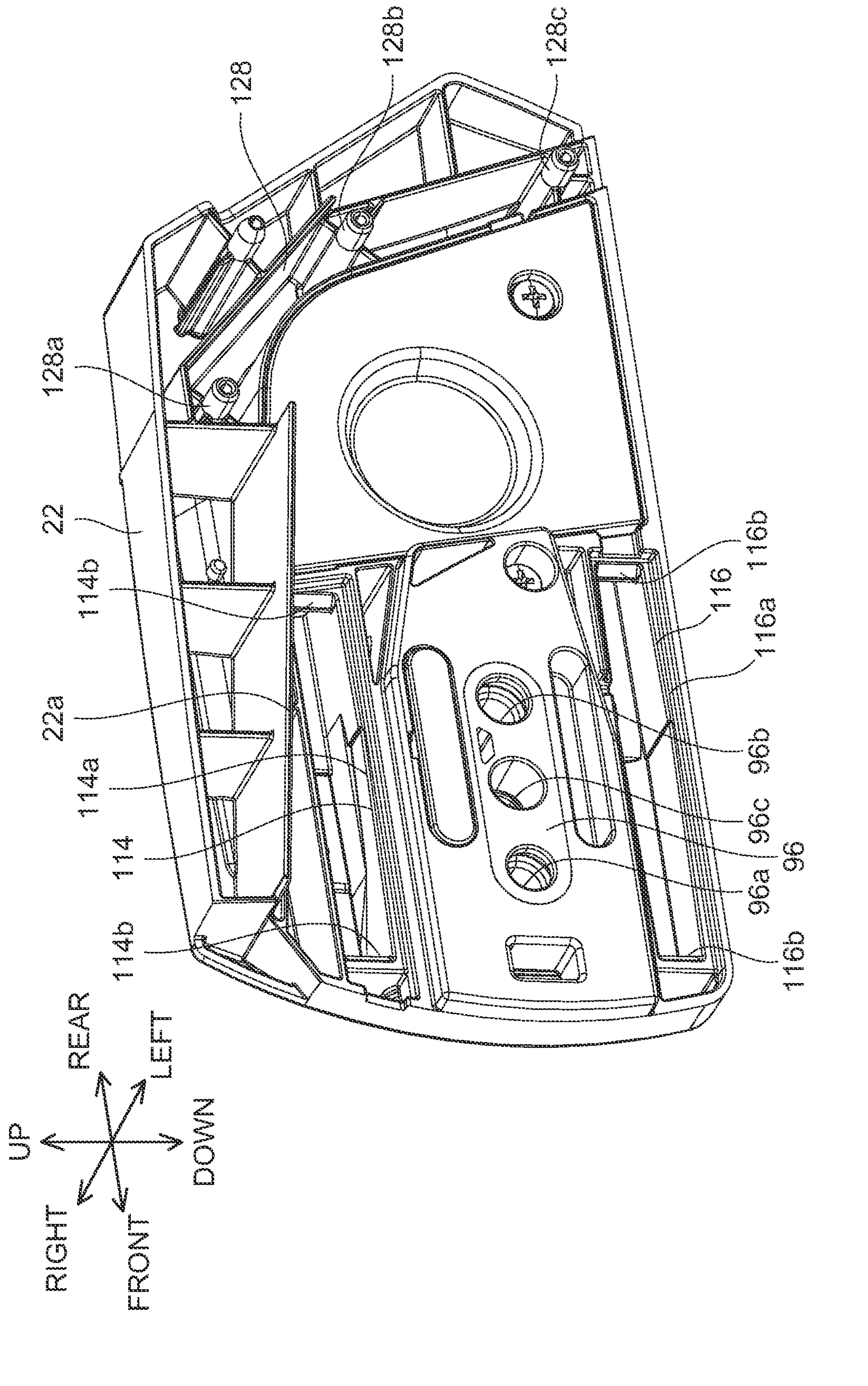
FIG. 16 is a perspective view seeing the sprocket cover 22 of the chainsaw 2 of the embodiment rom the font right upper side with the chain guides 110, 112 and the chip guide 118 detached.

As shown in FIG. 15, the chain guide 110 includes a substantially flat plate-shaped guiding part 110*a* and engaging parts 110*b* protruding rightward from the guiding part 110*a*. The chain guide 112 includes a substantially flat plate-shaped guiding part 112*a* and engaging parts 112*b* protruding rightward from the guiding part 112*a*. As shown in FIG. 16, a guide attaching part 114 to which the chain guide 110 is detachably attached and a guide attaching part 116 to which the chain guide 112 is detachably attached are arranged on a left surface of the sprocket cover 22. The guide attaching part 114 includes an attaching groove 114*a* configured to receive the guiding part 110*a* and engagement receiving parts 114*b* to which the engaging part 110*bs* are to be engaged. The guide attaching part 116 includes an attaching groove 116*a* configured to receive the guiding part 112*a* and engagement receiving parts 116*b* to which the engaging parts 112*b* are to be engaged. By configuring as such, even when the chain guides 110, 112 are damaged due to contact with the saw chain 8, work to replace them with new chain guides 110, 112 can easily be performed.

As shown in FIG. 14, a chip guide 118 is further arranged on a left surface of the sprocket cover 22. The chip guide 118 is constituted of a rubber material such as nitrile rubber. As shown in FIG. 15, the chip guide 118 includes a first guiding part 120, a second guiding part 122, a third guiding part 124, and a supporting part 126. The first guiding part 120, the second guiding part 122, the third guiding part 124, and the supporting part 126 are seamlessly integrated. The first guiding part 120 includes a guiding surface 120*a* having a substantially columnar surface shape. A curvature radius of the guiding surface 120*a* is within a range of 24 mm to 36 mm, and may for example be 30 mm. The second guiding part 122 includes a guiding surface 122*a* having a substantially columnar surface shape and a guiding surface 122*b* having a substantially flat surface shape. A curvature radius of the guiding surface 122*a* is within a range of 4 mm to 10 mm, and may for example be 6 mm. A longitudinal length of the guiding surface 122*b* is within a range of 30 mm to 40 mm, and may for example be 34 mm. The guiding surface 122*a* is connected to the guiding surface 120*a* at its one end and is connected to the guiding surface 122*b* at its other end. The third guiding part 124 includes a guiding surface 124*a* having a substantially columnar shape and a guiding surface 124*b* having a substantially flat surface shape. A curvature radius of the guiding surface 124*a* is within a range of 3 mm to 7 mm, and may for example be 5 mm. A longitudinal length of the guiding surface 124*b* is within a range of 14 mm to 25 mm, and may for example be 18 mm. The guiding surface 124*a* is connected to the guiding surface 122*b* at its one end and is connected to the guiding surface 124*b* at its other end. The supporting part 126 includes engaging holes 126*a*, 126*b*, 126*c*. As shown in FIG. 16, a guide attaching part 128 to which the chip guide 118 is to be detachably attached is arranged on the left surface of the sprocket cover 22. The guide attaching part 128 includes engaging pins 128*a*, 128*b*, 128*c* configured to engage with the engaging holes 126*a*, 126*b*, 126*c*. By configuring as such, even when the chip guide 118 is damaged due to contact with the saw chain 8, work to replace it with a new chip guide 118 can easily be performed. As shown in FIG. 14, a substantially flat plate-shaped guide rib 22*a* protruding leftward is arranged on the left surface of the sprocket cover 22. When the chip guide 118 is attached to the sprocket cover 22, a lower surface of the guide rib 22*a* and the guiding surface 120*a* are arranged substantially flush with substantially no gap in between.

Figure 17:
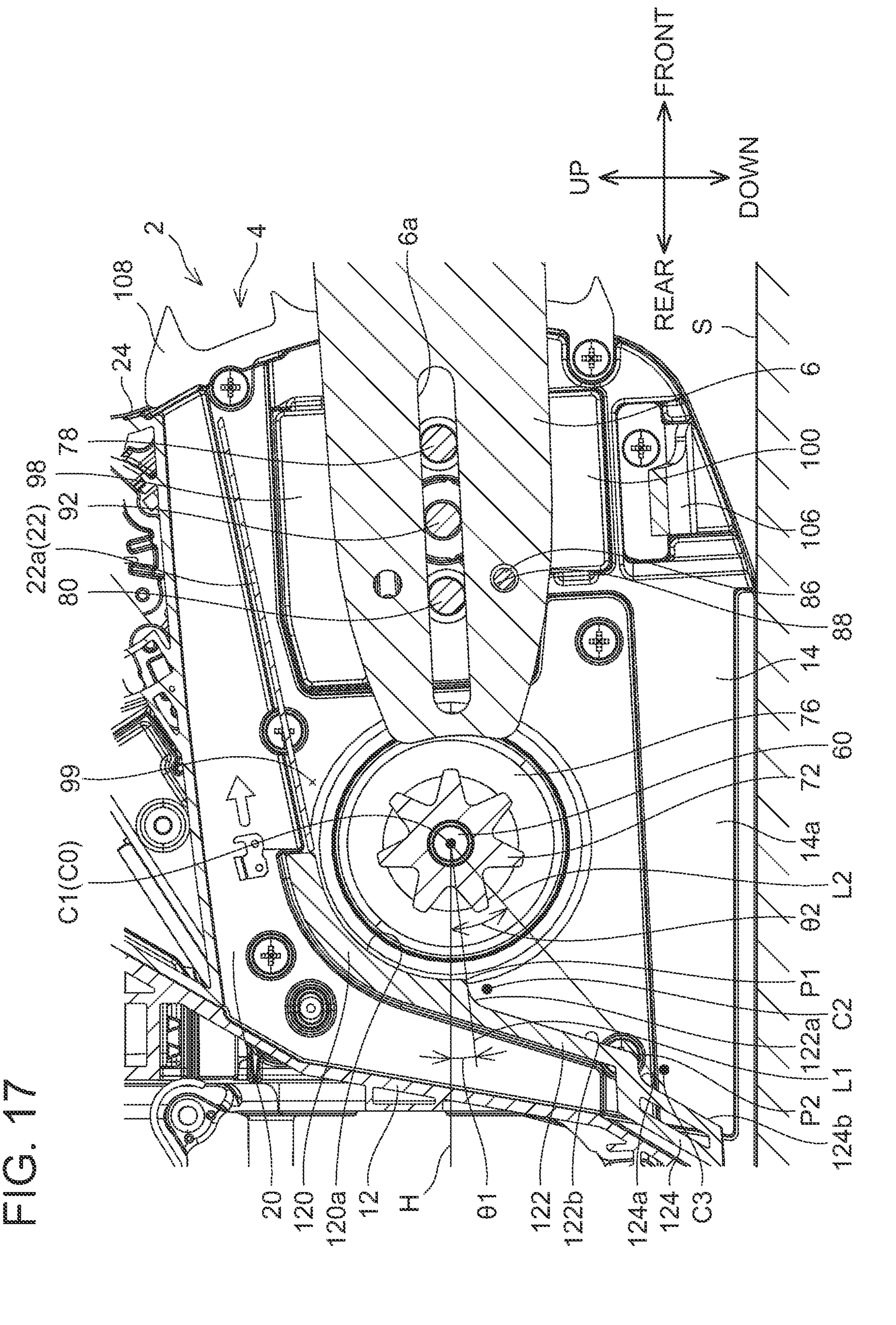
FIG. 17 is a vertical cross-sectional view of a sprocket 72 of the chainsaw 2 of the embodiment and its vicinity.

As shown in FIG. 17, when the sprocket cover 22 is arranged on the body housing 24, the guide rib 22*a* is arranged on the front upper side of the sprocket 72, the first guiding part 120 is arranged on the rear upper side of the sprocket 72, and the second guiding part 122 and the third guiding part 124 are arranged on the rear lower side of the sprocket 72. When the chainsaw 2 is seen from the right, a center C1 of a curvature circle of the guiding surface 120*a* of the first guiding part 120 substantially coincides with a center C0 of the output shaft 60. When the chainsaw 2 is seen from the right, a center C2 of a curvature circle of the guiding surface 122*a* of the second guiding part 122 is offset to the rear lower side from the center C1 of the curvature circle of the guiding surface 120*a* of the first guiding part 120. An amount of this rearward offset of the center C2 of the curvature circle of the guiding surface 122*a* from the center C1 of the curvature circle of the guiding surface 120*a* is in a range of 24 mm to 38 mm, and may for example be 31 mm. When the chainsaw 2 is seen from the right, an angle θ1 formed by a horizontal plane H and a line L1 connecting a connection point P1 of the guiding surface 120*a* and the guiding surface 122*a* with the center C0 of the output shaft 60 is in a range of $-10$ degrees$\leq\theta 1\leq$25 degrees. Here, θ1 is positive when P1 is located below C0, and is negative when P1 is located above C0. For example, in this embodiment, θ1 is 6 degrees. When the chainsaw 2 is seen from the right, a center C3 of a curvature circle of the guiding surface 124*a* of the third guiding part 124 is offset to the rear lower side from the center C2 of the curvature circle of the guiding surface 122*a* of the second guiding part 122. An amount of this rearward offset of the center C3 of the curvature circle of the guiding surface 124*a* from the center C2 of the curvature circle of the guiding surface 122*a* is in a range of 10 mm to 30 mm, and may for example be 19 mm. When the chainsaw 2 is seen from the right, an angle θ2 formed by the horizontal plane H and a line L2 connecting a connection point P2 of the guiding surface 122*a* and the guiding surface 124*a* with the center C0 of the output shaft 60 is in a range of 32 degrees$\leq\theta 2\leq$50 degrees. Here, θ2 is positive when P2 is located below C0, and is negative when P2 is located above C0. For example, in this embodiment, θ2 is 41 degrees.

By having the guide rib 22*a* arranged as above, the passage area of the chain passage 99 on the front upper side of the sprocket 72 can be decreased, by which the cutting chips can be suppressed from entering deep into the chain passage 99. Further, by having the first guiding part 120 arranged as above, the passage area of the chain passage 99 on the tear upper side of the sprocket 72 can be decreased, by which the cutting chips can be suppressed from entering deep into the chain passage 99. Moreover, by having the second guiding part 122 arranged as above, the cutting chips that entered into the chain passage 99 can easily be discarded toward the rear lower side. By having the third guiding part 124 arranged as above, the cutting chips that entered into the chain passage 99 can easily be discarded toward the rear lower side.

As shown in FIG. 1, the front hand guard 18 includes a guard part 18*a*, a left supporting part 18*b*, and a right supporting part 18*c*. As shown in FIG. 5, the guard part 18*a* is arranged in front of the upper holding part 16*b* of the front handle 16, and is configured to protect the hand of the user holding the upper holding part 16*b*. As shown in FIG. 2, the left supporting part 18*b* extends rearward and downward from the left lower end of the guard part 18*a*. The left supporting part 18*b* is held at the vicinity of its lower end by the left housing 10 such that it is rotatable about a rotation shaft 18*d* (see FIG. 8) extending in the left-right direction. As shown in FIG. 11, the right supporting part 18*c* extends downward from the right end of the guard part 18*a*. The right supporting part 18*c* is held at the vicinity of its lower end by the base plate 14*a* such that it is rotatable about a rotation shaft 18*e* extending in the left-right direction. The rotation shaft 18*d* (see FIG. 8) and the rotation shaft 18*e* are arranged substantially colinear. Due to this, the front hand guard 18 is configured to rotate between a normal position at which it is pulled upward relative to the body housing 24 and a stop position at which it is pressed down forward. As shown in FIG. 8, a stop detection switch 129 is arranged on the left surface of the base plate 14*a*. The stop detection switch 129 is configured to detect whether the front hand guard 18 is in the stop position. The stop detection switch 129 is electrically connected to the control unit 34 (see FIG. 6).

As shown in FIG. 11, the right surface of the base plate 14*a* includes a lock member 130 and a compression spring 132. The lock member 130 includes a protrusion 130*a* that enters into a recess 18*f* defined in the right supporting part 18*c* of the front hand guard 18. The compression spring 132 biases the lock member 130 with respect to the base plate 14*a* in a direction along which the protrusion 130*a* enters into the recess 18*f*. Due to this, even if a force in a direction pressing down the front hand guard 18 forward is applied to the front hand guard 18, a state in which the protrusion 130*a* is within the recess 18*f* is maintained by a biasing force of the compression spring 132 so long as the force is smaller than a predetermined value, as a result of which the front hand guard 18 is maintained in the normal position. On the other band, if the force is greater than the predetermined value, the protrusion 130*a* exits the recess 18*f* against the biasing force of the compression spring 132, and the front hand guard 18 thereby rotates from the normal position to the stop position.

The right surface of the base plate 14*a* further includes an arm member 134, a link member 136, a brake member 138, a brake band 140, and a compression spring 142. One end of the arm member 134 is fixed to the right supporting part 18*c* of the front hand guard 18. The other end of the arm member 134 is rotatably connected to one end of the link member 136. The other end of the link member 136 is rotatably connected to the brake member 138. The brake member 138 is held by the base plate 14*a* such that it is slidable between a normal position on the ear lower side and a stop position on the front upper side. The brake band 140 is arranged to surround a periphery of the brake drum 76. One end of the brake band 140 is held by the brake member 138. The other end of the brake band 140 is fixed to the base plate 14*a*. When the front hand guard 18 rotates from the normal position to the stop position, the arm member 134 also rotates together with the front hand guard 18, by which the arm member 134 and the link member 136 enter a state of being inclined relative to one another, and the brake member 138 moves from the normal position to the stop position. Due to this, the brake band 140 decreases its diameter, by which an inner circumferential surface of the brake band 140 comes into contact with an outer circumferential surface of the brake drum 76, and the rotation of the output shaft 60 is braked by a frictional force between them. When the front band guard 18 rotates from the stop position to the normal position, the arm member 134 also rotates with the front hand guard 18, by which the arm member 134 and the link member 136 enter a state of being arranged substantially colinear, and the brake member 138 thereby moves from the stop position to the normal position. Due to this, the brake band 140 increases its diameter, by which the inner circumferential surface of the brake band 140 separates from the outer circumferential surface of the brake drum 76, and the brake on the rotation of the output shaft 60 is thereby released.

The compression spring 142 biases the brake member 138 from the normal position toward the stop position. When the front hand guard 18 is in the normal position and the arm member 134 and the link member 136 are arranged substantially colinear, the brake member 138 is maintained in the normal position even if a biasing force of the compression spring 142 is applied to the brake member 138. However, when an impact is applied to the chainsaw 2 by a kickback motion during the cutting work, the arm member 134 and the link member 136 are slightly inclined relative to one another, and the brake member 138 moves from the normal position to the stop position by the biasing force of the compression spring 142. Due to this, the front hand guard 18 rotates from the normal position to the stop position, and also the rotation of the output shaft 60 is braked by the frictional force of the brake band 140 and the brake drum 76.

The oil tank 48 shown in FIG. 6 stores lubricant oil for lubricating the saw chain 8. The oil tank 48 has a cap 144 to be detachably attached to a refill opening 48*a* (see FIG. 7) for refiling the lubricant oil in the oil tank 48. As shown in FIG. 2, the cap 144 of the oil tank 48 is exposed outside of the left housing 10, and is arranged on the front left surface of the body housing 24.

The oil pump 50 shown in FIG. 6 is configured to suction the lubricant oil in the oil tank 48 through an inlet tube 146 and feeds out the lubricant oil toward the guide bar 6 through an outlet tube 148 in conjunction with the rotation of the motor 46. The lubricant oil fed to the outlet tube 148 is supplied to the guide bar 6 and the saw chain 8 (see FIGS. 1 to 3) via an oil supply port 14*d* (see FIG. 11) defined in the base plate 14*a*. A worm gear 130 for driving the oil pump 50 is fitted in in the vicinity of the left end of the output shaft 60 of the motor 46. As shown in FIG. 7, the worm gear 150 is arranged to the left of the bearing 70. A discharge amount of the lubricant oil supplied from the oil tank 48 to the guide bar 6 by the oil pump 50 can be adjusted using an adjustment pin 152 (see FIG. 8).

As shown in FIG. 2, an adjusting opening 24*h* through which the adjustment pin 152 can be accessed from outside is defined in the lower surface of the body housing 24 (specifically, the lower surface of the left housing 10). The user can rotate the adjustment pin 152 by inserting a tool through the adjusting opening 24*h* to adjust the amount of the lubricant oil discharged from the oil pump 50. In the left-right direction of the chainsaw 2, the adjusting opening 24*h* is arranged in the vicinity of the left end of the body housing 24.

Figure 18:
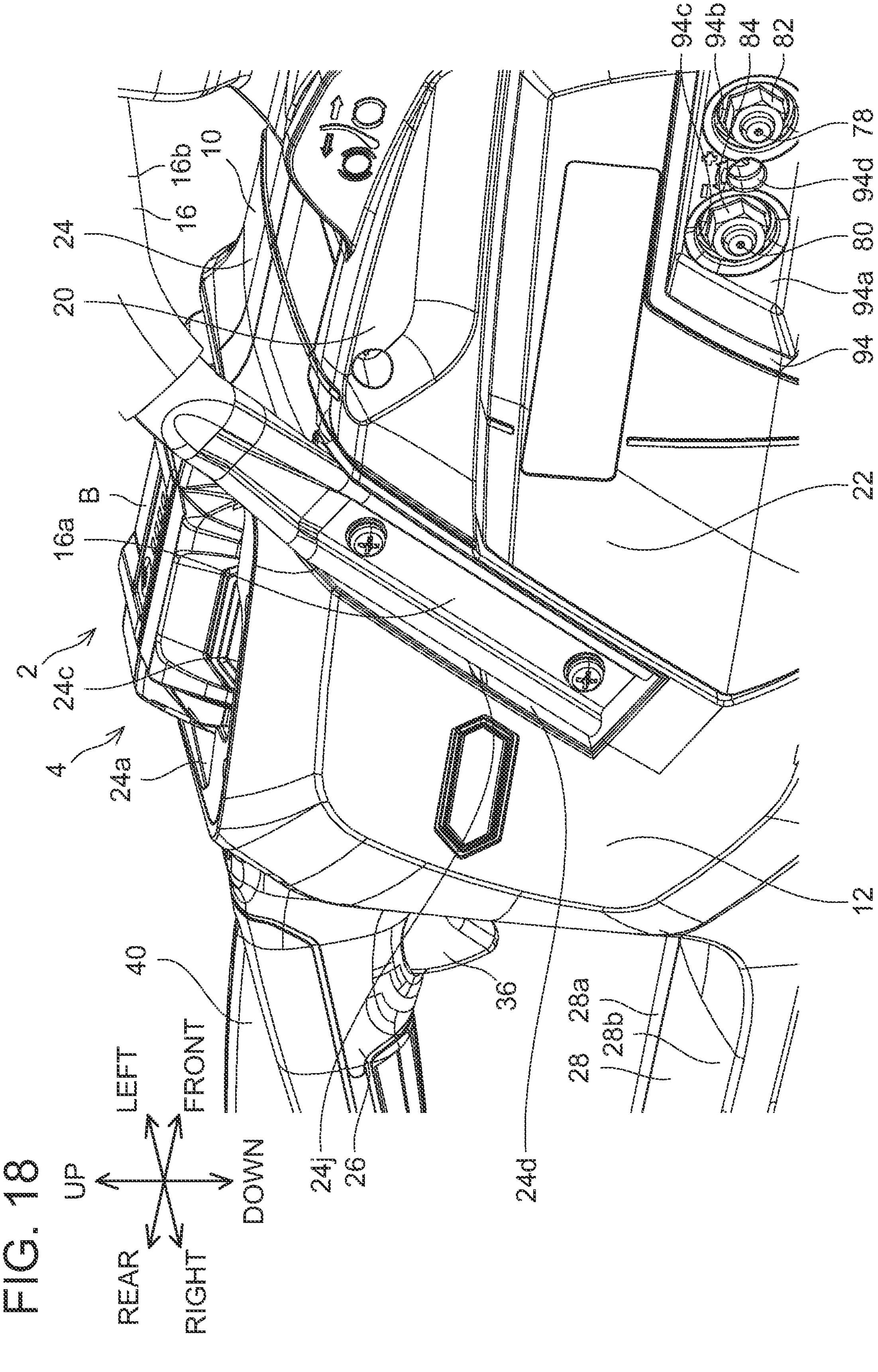
FIG. 18 is a perspective view seeing a water draining hole 24*j* of the chainsaw 2 of the embodiment and its vicinity from the front right upper side.

A water draining hole 24*i* communicating with the battery pack receptacle 24*a* (FIG. 4) is defined in the lower surface of the body housing 24 (specifically, the lower surface of the left housing 10). Due to this, even when water enters into the battery pack receptacle 24*a*, it can be drained through the water draining hole 24*i*. Further, as shown in FIG. 18, a water draining hole 24*j* communicating with inside of the body housing 24 is defined in the right handle attaching groove 24*d* of the body housing 24. Due to this, even when water enters into the body housing 24, it can be drained through the water draining hole 24*j* by tilting down the chainsaw 2 to the right. Further, since the water draining hole 24*j* is arranged at a position that is not noticeable, thus will not deteriorate aesthetics of the chainsaw 2. Further, since the water draining hole 24*j* is arranged at a position remotely separated from the guide bar 6, the cutting chips can be suppressed from entering into the body housing 24 through the water draining hole 24*j*.

In the chainsaw 2 of the present embodiment, a volume of the base member 14 is 400 $cm^3$ or more, may for example be 500 $cm^3$ or more, and may for example be about 550 $cm^3$. Further, a weight of the base member 14 is 2% or more of an entire weight of the chainsaw 2 including the guide bar 6, the saw chain 8, and the battery pack B, may for example be 3% or more, and may for example be about 4%. By using the base member 14 that is large-sized and heavy, a heat capacity of the base member 14 can be increased, and thus a temperature rise in the base member 14 can be suppressed.

In the chainsaw 2 of the present embodiment, a space in which the motor 46 is housed and a space through which the saw chain 8 passes are separated by the base member 14. By configuring as such, the cutting chips can be suppressed from reaching the motor 46 and adversely affecting the operation of the motor 46.

(Variants)

The chainsaw 2 may not be equipped with the battery pack B, and may be supplied with electric power through a power cable.

The motor 46 may be an outer rotor DC brushless motor. Alternatively, the motor 46 may be a brush motor or another type of electric motor.

The chainsaw 2 may include an engine with an internal combustion mechanism instead of the motor 46 as its prime mover for rotating the sprocket 72. In this case, the output shaft 60 connected to the sprocket 72 may be rotated by actuation of the engine.

The material of the base member 14 is not limited to a magnesium alloy, and may be any heat conductive material with thermal conductivity of 10 W/m·K or more when the temperature of the material is 300K, and may for example be a metal material such as austenite-based stainless steel or a nonmetal material.

The chip guide 118 may be arranged detachably on the right surface of the body housing 24 (specifically, the right surface of the brake cover 20) instead of the left surface of the sprocket cover 22. Further, the chip guide 118 may not include the third guiding part 124. Further, in the chip guide 118, the first guiding part 120, the second guiding part 122, and the third guiding part 124 may be configured as separate components, each of which may be configured to be detachably attached to the sprocket cover 22 or the body housing 24 independent from one another.

As above, in one or more embodiments, the chainsaw 2 comprises: the saw chain 8; the guide bar 6 equipped with the saw chain 8; the sprocket 72 for running the saw chain 8 along the periphery of the guide bar 6; the motor 46 including the output shaft 60 connected to the sprocket 72; the cooling fan 62 connected to the output shaft 60; and the base member 14 for holding the guide bar 6. The base member 14 is constituted of the heat conductive material having the thermal conductivity of 10 W/m·K or more when the temperature thereof is 300 K. The base member 14 includes: the base plate 14*a* (example of plate portion) arranged such that the base plate 14*a* faces the motor 46 in the direction along the output shaft 60 (such as the left-right direction); and the supporting rib 14*b* (example of rib portion) protruding from the base plate 14*a* toward the motor 46.

In the above configuration, since the base member 14 has a high thermal conductivity, heat is transmitted from the guide bar 6 to the base member 14 when the temperature of the guide bar 6 rises. Further, in the above configuration, since cooling air by the cooling fan 62 cools the base plate 14*a* and the supporting rib 14*b* of the base member 14 while the motor 46 is driving, heat can efficiently be rejected from the base member 14. Due to this, according to the above configuration, outer shells of the base member 14 and the members in the vicinity thereof (such as the bolts 78, 80, the nuts 82, 84, the chain catcher 106, and the spike 108) can be suppressed from becoming hot by heat transmission from the guide bar 6.

In one or more embodiments, the cooling fan 62 is a centrifugal fan. The cooling fan 62 is arranged between the motor 46 and the base plate 14*a*. The supporting rib 14*b* is arranged such that the supporting rib 14*b* surrounds the cooling fan 62 from radially outside the cooling fan 62.

According to the above configuration, efficiency for the cooling fan 62 to cool the base member 14 can further be improved.

In one or more embodiments, the heat conductive material of the base member 14 is a magnesium alloy.

According to the above configuration, the base member 14 that is light weight and having high thermal conductivity can be realized while securing rigidity and strength required for the base member 14.

What is claimed is:

1. A chainsaw comprising:

a saw chain;

a guide bar equipped with the saw chain;

a sprocket for running the saw chain along a periphery of the guide bar;

a motor including an output shaft connected to the sprocket;

a cooling fan connected to the output shaft; and a base member for holding the guide bar, wherein the base member is constituted of a heat conductive material having a thermal conductivity of 10 W/m·K or more when a temperature of the heat conductive material is 300 K, and the base member includes:

a plate portion arranged such that the plate portion faces the motor in a direction along the output shaft; and a rib portion protruding front the plate portion toward the motor.

2. The chainsaw according to claim 1, wherein the cooling fan is a centrifugal fan, the cooling fan is arranged between the motor and the plate portion, and the rib portion is arranged such that the rib portion surrounds the cooling fan from radially outside the cooling fan.

3. The chainsaw according to claim 1, wherein the heat conductive material is a magnesium alloy.

4. The chainsaw according to claim 2, wherein the heat conductive material is a magnesium alloy.

* * * * *